(12) United States Patent
Graves, Jr. et al.

(10) Patent No.: US 8,784,514 B1
(45) Date of Patent: Jul. 22, 2014

(54) CARPET FUEL PROCESSING BOILER

(75) Inventors: Reese Edward Graves, Jr., Cleveland, TN (US); John Daniel Hall, Trion, GA (US); Garrett Townsend Hicks, Jr., Cohutta, GA (US); Gregory Glenn Wimpy, Cartersville, GA (US)

(73) Assignee: Columbia Insurance Company, Omaha, NE (US)

( * ) Notice: Subject to any disclaimer, the term of this patent is extended or adjusted under 35 U.S.C. 154(b) by 393 days.

(21) Appl. No.: 13/298,197

(22) Filed: Nov. 16, 2011

Related U.S. Application Data

(60) Provisional application No. 61/414,746, filed on Nov. 17, 2010.

(51) Int. Cl.
*C10L 5/00* (2006.01)

(52) U.S. Cl.
USPC ......................................... 44/605; 241/24.19

(58) Field of Classification Search
CPC ............ C08J 11/04; Y02E 50/30; C10L 5/40; C10L 5/46
USPC ......................................... 44/605; 241/24.19
See application file for complete search history.

(56) References Cited

U.S. PATENT DOCUMENTS 5,722,603 A * 3/1998 Costello et al. ............... 241/20
2007/0045455 A1 * 3/2007 Tuzson et al. ............. 241/24.19

* cited by examiner

*Primary Examiner* — Cephia D Toomer
(74) *Attorney, Agent, or Firm* — Ballard Spahr LLP

(57) ABSTRACT

The present invention relates generally to the production of energy and the reclamation of carpet waste material. More particularly, the invention relates to a method and system for storing and using post industrial and post consumer carpet as fuel in an energy generation process and for producing at least one recyclable carpet waste material.

31 Claims, 11 Drawing Sheets

CARPET FUEL PROCESSING BOILER

CROSS-REFERENCE TO RELATED APPLICATIONS

This application claims priority to U.S. Provisional Patent Application No. 61/414,746, which was filed on Nov. 17, 2010, which is hereby incorporated by reference in its entirety.

FIELD OF THE INVENTION

The present invention relates generally to the production of energy and the reclamation of carpet waste material. More particularly, the invention relates to a method and system for storing and using post industrial and post consumer carpet as fuel in an energy generation process and for producing at least one recyclable carpet waste material.

BACKGROUND OF THE INVENTION

Waste material inflow into resource limited landfills is strained by the voluminous amount of post consumer carpet waste produced by carpet distributors and carpet installation contractors and post industrial carpet waste produced by carpet manufacturers. Post industrial carpet waste can include, for example, commercial, industrial and residential carpet waste; manufacturing remnants; quality control failures, and the like. Post consumer carpet waste can be, for example, used carpet, e.g., carpet removed from a home, apartment complex, or a commercial installation, or unused carpet, e.g., residual carpet left from an installation or manufacturing process. While most estimates indicate that carpet waste constitutes only 1 to 2% of all municipal solid waste, this amount still represents a vast quantity of waste that can have a substantial economic and environmental impact.

The carpet waste inflow into landfills is not generally environmentally beneficial. In an effort to mitigate the amount of carpet waste that is shipped to landfills, efforts are being made to manually recycle at least a portion of the carpet waste prior to insertion into the landfill waste stream. Recycling carpet, however, is difficult because its major components are chemically and physically diverse. Most carpets comprise about 20-50 percent weight face fiber, the remainder being backing materials, commonly polypropylene, and an adhesive which attaches the carpet fiber to the backing material. The adhesive typically comprises a carboxylated styrene-butadiene (XSB) latex copolymer, and inorganic filler like calcium carbonate. Because of these difficulties, the amount of carpet reclaimed through recycling operations to date is limited, and only a minimal percentage of the total carpet waste may be useful in the production of green technology products. Accordingly, there is a need for efficient recycling of post industrial and post consumer carpet waste to reduce the amount of waste being disposed of at landfills.

Most carpet recycling methods to date have focused on recycling certain environmentally malignant constituents of carpet. Examples include polymers, such as nylon, and adhesive constituents found in carpet waste. However, little attention has been devoted to the various other constituents of carpet, such as inorganic filler. While such constituents may not present a direct environmental harm, they nonetheless represent a potential cost savings and a reduction in landfilling burden. If such materials could be reclaimed and recycled, the supply of such materials could be augmented, thereby reducing the burden to manufacture new materials. In addition, such broad-based recycling methods can also potentially help to comport with National Sanitation Foundation (NSF) 140/2007 recommendations, which encourage carpet industries to develop sustainable carpet manufacturing and recycling programs for social, economic, and environmental benefits.

Generally, carpet manufacturers use steam, electricity or other energy sources in their manufacturing processes. Energy may be purchased directly (electricity, for example) or produced from a number of processes and energy sources, such as coal or natural gas (steam, for example). However, conventional energy production processes may be relatively inefficient and/or environmentally unfriendly. Accordingly, there is a need for production of required energy for carpet manufacturers that is derived from post industrial and post consumer carpet waste that would otherwise be diverted to landfills. In addition, the conversion of post industrial and post consumer carpet waste into energy will result in cleaner emissions when compared to the consumption of coal. Moreover, by utilizing diverted carpet material, carpet manufacturers can reduce and stabilize steam production costs significantly. Further, there is a need to provide improved carpet recycling methods and systems that can yield reclaimed materials suitable for use in the manufacture of new carpets and like materials.

SUMMARY

The present invention provides a method and system for energy production that is fueled by carpet waste material and for the separation and storage of waste products generated through the energy production process. The present invention may permit a significant amount of carpet waste material to be recycled and used as a biomass fuel, while separating and storing at least one reusable raw material that a manufacturer typically uses. It is contemplated that the carpet waste can be any carpet, including latex coated carpet. In one aspect, the carpet can be a post consumer carpet, post industrial carpet, manufacturing remnants, quality control failures, carpet fiber and the like. In a further aspect, the carpet can comprise a carpet waste that would otherwise be discarded or landfilled by a consumer, distributor, retailer, installer, and the like. For example and not meant to be limiting, a typical carpet structure includes woven fiber material affixed to a carpet backing.

The method and system described herein generally comprises providing a carpet waste composition comprising an inorganic filler component, such as, for example and not meant to be limiting, carpet fines from the carpet backing, and an organic component, such as, for example and not meant to be limiting, carpet fibers. The method also generally comprises mechanically treating the carpet waste composition under conditions effective to separate at least a portion of the organic component from the carpet waste composition and to provide a reclaimed inorganic filler composition at least substantially free of the organic component. In this aspect, the separated portion of the organic component from the carpet waste composition forms a first combustible stream and the separated reclaimed inorganic filler composition forms a first waste steam. Also disclosed is the combustion of at least the first combustible stream to generate energy and to generate or otherwise provide a second waste stream comprising waste ash from the combustion process.

In one aspect, the first waste stream is stored in a first waste storage unit as a first waste product and the first combustible stream is delivered to a boiler for use as a biomass fuel. In a further aspect, a second organic fuel component can be added to the first combustible stream before introduction into the boiler. In this aspect, it is contemplated that the second organic fuel component can have a higher BTU/weight content then that of the portion of the organic component from the carpet waste composition that forms the first combustible stream. In one exemplary aspect, the second organic fuel can comprise post consumer or post industrial fibers, such as, for example and without limitation, shear lint, elutriated fiber, and the like.

Combustion of the carpet generated combustible materials can be used to ultimately generate high/low pressure steam, electricity or other usable energy product, and generate ash as a by-product. The ash may be moved within a second waste stream and stored within the second waste storage unit. In one aspect, the second waste stream may be distinct and isolated from the first waste product stream such that the ash and carpet fines remain separated from each other, at least until the hot waste ash cools to or below the melting point of the carpet fines. It is contemplated that the first and second waste storage units may each be part of distinct waste product streams such that the individual waste products generated can be isolated from each other and therefore available for beneficial reuse.

Additional embodiments of the invention will be set forth, in part, in the detailed description, figures, and claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

These and other features of the preferred embodiments of the invention will become more apparent in the detailed description in which reference is made to the appended drawings wherein.

DETAILED DESCRIPTION

Figure 1:
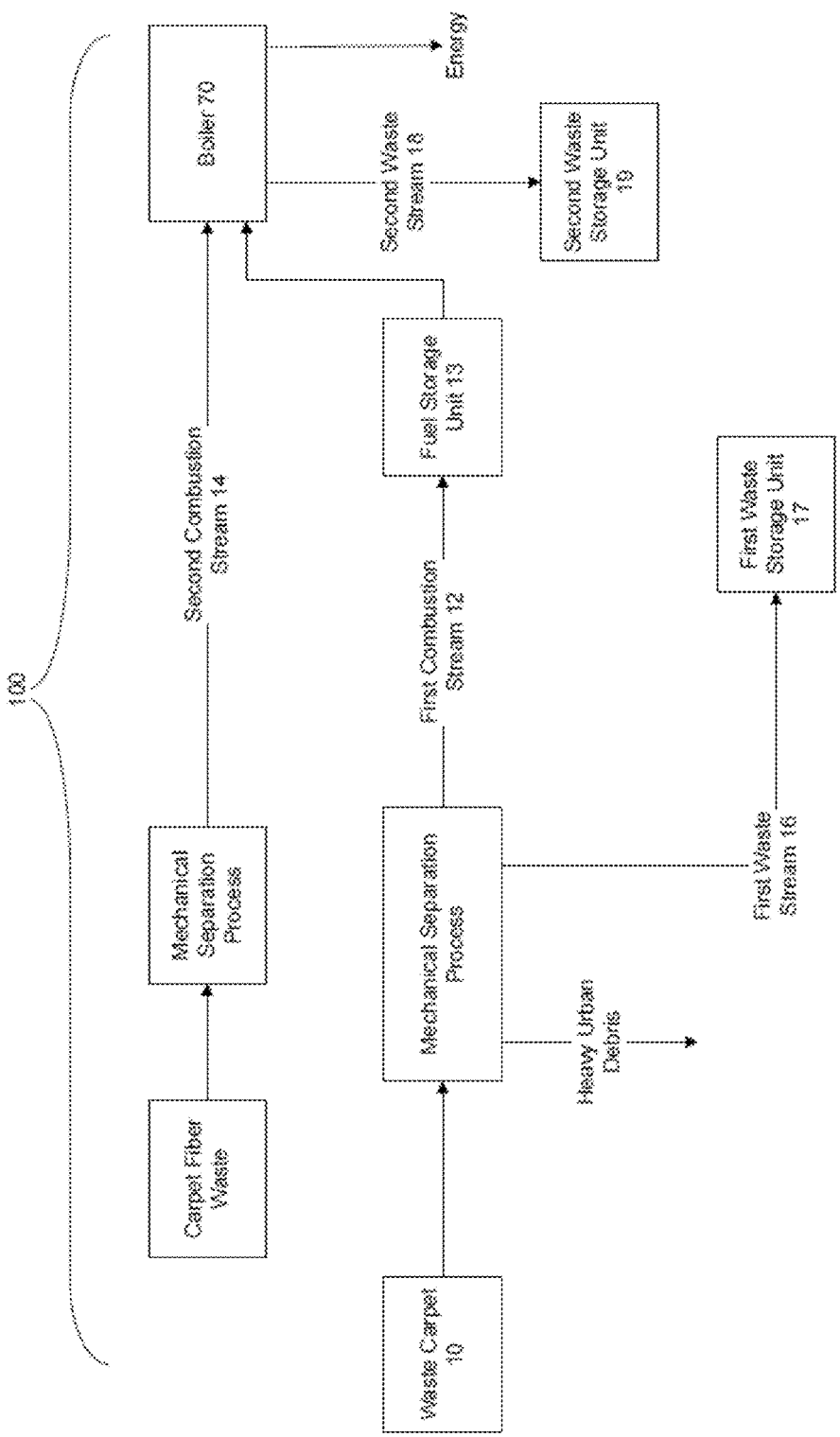
FIG. 1 is a schematic representation of an exemplary method and system for generating energy from carpet waste and for storing waste products generated through the exemplary method and system.

The present invention may be understood more readily by reference to the following detailed description, examples, drawings, and claims, and their previous and following description. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

As used in the specification and the appended claims, the singular forms "a," "an" and "the" include plural referents unless the context clearly dictates otherwise. Thus, for example, reference to a "waste stream" can include two or more such waste streams unless the context indicates otherwise.

Ranges may be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

Without the use of such exclusive terminology, the term "comprising" in the claims shall allow for the inclusion of any additional element—irrespective of whether a given number of elements are enumerated in the claim, or the addition of a feature could be regarded as transforming the nature of an element set forth in the claims. Except as specifically defined herein, all technical and scientific terms used herein are to be given as broad a commonly understood meaning as possible while maintaining claim validity.

References in the specification and concluding claims to parts by weight of a particular element or component in a composition or article, denotes the weight relationship between the element or component and any other elements or components in the composition or article for which a part by weight is expressed. Thus, in a composition or a selected portion of a composition containing 2 parts by weight of component X and 5 parts by weight component Y, X and Y are present at a weight ratio of 2:5, and are present in such ratio regardless of whether additional components are contained in the composition.

A weight percent of a component, unless specifically stated to the contrary, is based on the total weight of the formulation or composition in which the component is included.

As used herein, and unless the context clearly indicates otherwise, the term carpet is used to generically include broadloom carpet, carpet tiles, and even area rugs. To that "broadloom carpet" means a broadloom textile flooring product manufactured for and intended to be used in roll form. "Carpet tile" denotes a modular floor covering, conventionally in 18"×18," 24"×24" or 36"×36" squares, but other sizes and shapes are also within the scope of the present invention.

The present invention may be understood more readily by reference to the following detailed description of preferred embodiments of the invention and the examples included therein and to the Figures and their previous and following description.

FIG. 1 schematically illustrates an exemplary energy generation and recycling method and system 100 according to one aspect of the present invention. As shown, a carpet waste composition 10 is provided. It is contemplated that the carpet waste composition 10 can be derived from any carpet. In one aspect, and without limitation, the carpet waste composition 10 can be a post consumer carpet, post consumer processed, for example, carpet carcasses, and post industrial, for example, selvedge, seams, and the like. It is contemplated that the carpet waste composition 10 can also comprise manufacturing remnants, quality control failures, and the like. In a further aspect, the carpet waste composition 10 can comprise a carpet waste that would otherwise be discarded or landfilled by a consumer, distributor, retailer, installer, and the like.

The carpet waste composition 10 can be derived from any desired carpet structure, including without limitation, tufted carpet, needle-punched carpet, and even hand woven carpet. In another aspect, the system and method described herein can be used in connection with broadloom carpets, carpet tiles, and even area rugs, so long as the carpet structure comprises at least one inorganic component desired for reclamation. In one aspect, a typical conventional carpet waste structure comprises fiber bundles, a primary backing material, an optional pre-coat layer, an adhesive backing material, an optional reinforcing layer, and an optional secondary backing material.

In one aspect, the carpet waste composition 10 can comprise an inorganic filler component. The inorganic filler component can comprise, inter alia, calcium carbonate, calcium sulfate, calcium silicate, magnesium carbonate, magnesium oxide, magnesium hydroxide aluminum trihydrate, alumina, hydrated alumina, aluminum silicate, barium sulfate, barite, flyash, glass cullet, glass fiber and powder, metal powder, clay, silica or glass, fumed silica, talc, carbon black or graphite, fly ash, cement dust, feldspar, nepheline, zinc oxide, titanium dioxide, titanates, glass microspheres, chalk, and mixtures thereof. Among these, preferred fillers comprise calcium carbonate, barium sulfate, talc, silica/glass, alumina, and titanium dioxide, and mixtures thereof. More preferable fillers comprise calcium carbonate.

In another aspect, the filler can be ignition resistant. Exemplary ignition resistant fillers can comprise antimony oxide, decabromobiphenyl oxide, alumina trihydrate, magnesium hydroxide, borates, and halogenated compounds. Of these ignition resistant fillers, those that comprise alumina trihydrate and magnesium hydroxide are preferred.

For example and without limitation, typical post-consumer carpet waste has a BTU/lb value that is between about 7,000 BTU/lb to about 10,000 BTU/lb. It is understood, however, that the BTU/lb value of an available post-consumer carpet waste can be lower than the exemplary values due to the entrapped presence of excessive amounts of accumulated dirt and the like. For example and without limitation, typical post-industrial carpet waste has a BTU/lb value that is between about 6,000 BTU/lb to about 8,000 BTU/lb.

The carpet waste composition 10 can be provided to the system 100 in the form of bales 11. In general, bales are the end product of a compaction process that is used to decrease the volume that a material occupies by increasing the density and weight. Bales are typically bound with polymeric bands or metal wire to keep the baled material from separating and are typically rectangular, square, round, and the like in shape. In one aspect, it is contemplated that the polymeric bands can comprise a combustible polymeric material. It is further contemplated that, prior to introduction into the system, the non-combustible metal wire can be removed manually or, optionally, by conventional dewiring equipment as further described herein. As one will appreciate, baled carpet waste can enhance the ease of the delivery and movement of the carpet waste. It is also contemplated that landfill owners and/or operators can also provide incentives for baling of carpet to reduce the volume requirement of the landfill. Optionally, the carpet waste composition 10 can be provided to the system 100 in a loose or otherwise non-compacted condition.

Referring back to FIG. 1, once the carpet waste composition 10 is provided, the composition can be mechanically treated under conditions effective to separate at least a portion of the organic component from the carpet waste composition and to provide a reclaimed inorganic filler composition at least substantially free of the organic component. In one aspect, the reclaimed inorganic filler composition can comprise residual organic matter not recycled and/or not removed during the mechanical treatment step. The residual organic matter can include, for example, any one or more of those organic materials discussed above. In one aspect, the reclaimed inorganic filler composition can be reused in another material or process. For example, materials other than carpeting materials that typically can use recovered calcium carbonate material as an inorganic filler include, without limitation, roofing materials, stucco, road paving materials, awnings, and tarps.

The mechanical separation of at least a portion of the organic component and the reclaimed inorganic filler composition results in a first combustible stream 12, which is conventionally generally referred to as carpet fibers, and a first waste stream 16, which is conventionally generally referred to as carpet fines. The carpet fines may have value as a raw material to the carpet manufacturer, and the carpet fines are detrimental to a gasification and combustion process since there is little available heating value. Therefore, the removal and storage of carpet fines may have economic, environmental and/or process efficiency value. The first combustible stream 12, which comprises the at least a portion of the organic component resulting from the mechanical separation process, can be selectively delivered to a downstream boiler 70 for combustion. For example and without limitation, the materials that form the first combustible stream 12 have a British Thermal Unit/pound (BTU/lb) value that is between about 8,000 BTU/lb to about 12,000 BTU/lb, about at least 9,000 BTU/lb, and preferably about at least 10,400 BTU/lb. In another example, the first combustible waste stream has a BTU/weight (BTU/wt) value that is greater than the BTU/wt value of the conventional carpet waste compositions described above that are initially fed into the system 100 by at least 25%, at least 30%, at least 35%, at least 40%, at least 45%, at least 50%, at least 55%, at least 60%, at least 65%, or at least 70%. The carpet material-fueled combustion within the boiler 70 produces energy in at least one form and generates a second waste stream 18 that is recyclable.

The first waste stream 16 can be moved to a first waste storage unit 17, such as, for example and without limitation, a silo for intermediate storage prior to being subsequently moved to a separate facility for recycling. It is also contemplated that the first combustible stream 12 can be moved to a fuel storage unit 13, such as a silo, for intermediate storage prior to the select delivery of the first combustible stream to the boiler. As one will appreciate, it is contemplated that the organic component of waste within the first combustible stream 12 can be used as the primary fuel for the energy production process.

However, it is optionally contemplated that the first combustible stream 12 can be mixed with another combustible stream having a higher BTU/wt value to enhance the overall BTU/wt value of the fuel delivered to the boiler 70. In a further aspect, a second combustible stream 14 formed from a second organic fuel component can be added to the first combustible stream 12 before introduction into the boiler 70. In this aspect, it is contemplated that the second organic fuel component will have a higher BTU/wt value than the portion of the organic component from the carpet waste composition 10 that forms the first combustible stream 12. In one exemplary aspect, the second organic fuel component can comprise post consumer or post industrial fibers, such as, for example and without limitation, shear lint, elutriated fiber, and the like.

Methods and systems for conditioning, storing, and transporting waste products generated through a thermal conversion process in the boiler 70 are also provided. As described in more detail below, it is contemplated that the boiler used to generate steam includes the use of a gasification process, which is the thermal conversion of a solid biomass fuel into a hot (over 1,000° F.) synthesis gas that contains combustible gases such as methane, hydrogen, carbon monoxide, and/or other gases. The combustion process in the boiler 70 can be configured to output high pressure steam, low pressure steam, and electricity as desired and to generate waste ash as a by-product. The waste ash may be moved within a second waste stream 18. Optionally, the second waste stream 18 can be conditioned through maceration and/or dewatering, thereby permitting safe, non-hazardous transportation of the second waste stream. Alternatively, the second waste stream 18 can be directly transported for other uses. In one aspect, the second waste stream 18 may be distinct and isolated from the first waste stream 16 such that the ash and carpet fines remain separated from each other, at least until the ash cools to or below the melting point of the carpet fines. It is contemplated that the first and second waste streams 16, 18 may each be part of distinct waste product streams such that the individual waste products generated can be isolated from each other and therefore available for beneficial reuse. In exemplary aspects, the waste products generated from each respective waste product stream may be stored in separate storage or transportation units. In these aspects, it is contemplated that the second waste stream 18 can be stored within a second waste storage unit 19.

As one will appreciate, using carpet waste materials as a biomass fuel for energy generation can produce a number of benefits. For example, the use of carpet waste materials to generate application steam may reduce reliance upon other sources of energy, such as coal and natural gas, which are limited in supply. Moreover, expending a significant portion of carpet waste materials as a fuel during energy generation can reduce the total volume of carpet waste products that ultimately is deposited in landfills. Therefore, the present invention may provide environmental benefits that conventional steam/energy generation processes or carpet disposal methods lack.

Figure 2:
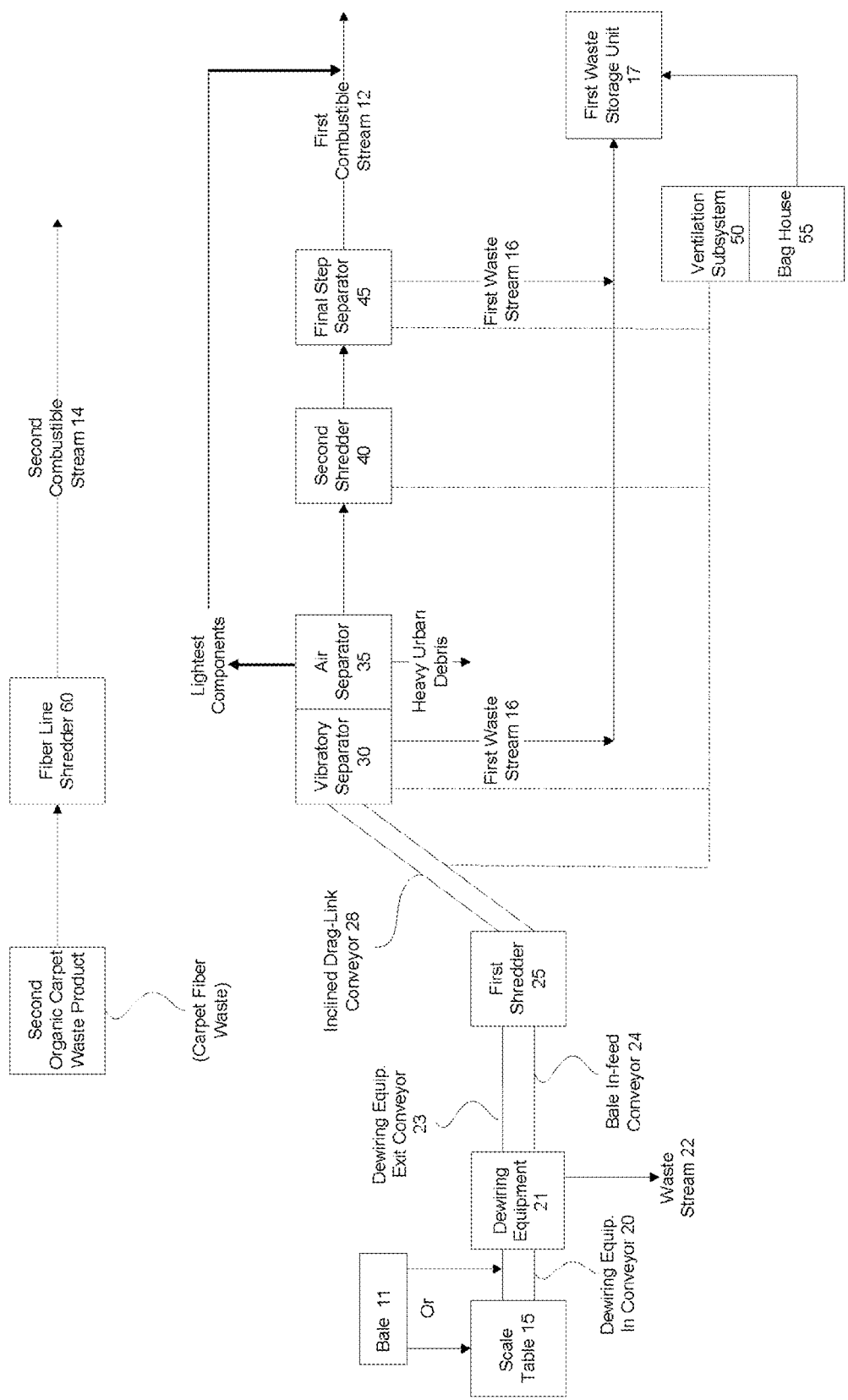
FIG. 2 is a schematic representation of a first stage of the exemplary method and system of FIG. 1, showing the mechanical process for separating at least a portion of the organic component from a carpet waste composition and to provide a reclaimed inorganic filler composition at least substantially free of the organic component. In this schematic, the separated portion of the organic component from the carpet waste composition forms a first combustible stream and the separated reclaimed inorganic filler composition forms a first waste stream.

FIG. 2 is a schematic representation of a first stage of the exemplary method and system of FIG. 1, showing the mechanical process for separating at least a portion of the organic component from a carpet waste composition and providing a reclaimed inorganic filler composition at least substantially free of the organic component. In this schematic, the separated portion of the organic component from the carpet waste composition forms a first combustible stream 12 and the separated reclaimed inorganic filler composition forms a first waste steam 16.

As shown in FIG. 2, in one exemplary aspect, the carpet waste composition (shown as bale 11) can initially be fed into conventional bale dewiring equipment 22 for removal of any polymeric or metallic banding material. In this aspect, a bale dewiring equipment feed conveyor 20 can be the position at which the baled carpet waste material is initially placed. In one aspect, the bale dewiring equipment 21 can be configured to remove non-combustible metal wires from the baled carpet waste material 11. In this aspect, the wire can be coiled and can become an additional waste stream 22, which is recyclable. It is contemplated that a bale dewiring equipment exit conveyor 23 can transport the bale contents to a bale in-feed conveyor 20.

In another exemplary aspect, a bale prep lift table can be the position at which the carpet waste material is initially placed. In this aspect, the bale prep lift table can be configured to raise the carpet bales up to the height of the bale in feed conveyor 24. In one aspect, the bale prep lift table can be a heavy duty lift table that is configured to accept fork lift fed bales of carpet waste material, allow manual removal of the bale wires/bands, and subsequently lift the bales onto the bale in feed conveyor 24. Optionally, it is contemplated that carpet bales having polymeric wire or strapping can be directly fork lifted thereunto the bale in feed conveyor 24 without the need for the bale prep lift table or the bale dewiring equipment 21. In another aspect, it is contemplated that the bales may be directly placed therein a downstream shredder, such as the first shredder 25 described below. In one aspect, the wires/bands of the bales will be processed with the bales. Optionally, it is contemplated that the carpet bales can be prepared and/or modified on a bale lift table prior to being placed on the bale in feed conveyor 24. It is further contemplated that the carpet bales can be de-wired and then, optionally, be re-baled with polymeric wire or strapping prior to placement on the bale in feed conveyor 24 or exposure to further processing.

It is contemplated that the bale in feed conveyor 24 is selectively controllable by a driver of a fork lift truck from which bales are delivered to the bale in feed conveyor 24. Alternatively, in another exemplary aspect, it is contemplated that an optic sensor can be positioned at a desired location along the length of the bale in feed conveyor for purposes of detecting passage of a first bale. In this aspect, the optic sensor can be configured to produce a signal indicative of passage of the first bale. It is contemplated that the sensor can be in operative communication with a processor. It is further contemplated that the processor can be in operative communication with means for loading a second bale onto the bale in feed conveyor 24 in response to passage of the first bale to control the sequential feeding of bales onto the bale in feed conveyor 24.

In a further aspect, it is contemplated that the system 100 can comprise a bale scale 15 that can be the position at which the baled carpet waste material is initially placed. In one exemplary aspect, the bale scale 15 can be a heavy duty scale that is configured to be attached to a fork lift truck to record the weight of the baled carpet waste material prior to initial placement and transport thereon the bale lift table or the bale in feed conveyor 24.

In one aspect, the conveyor system described herein with respect to the generation of the first combustible waste stream can generate a carpet flow rate up to approximately 14,600 lb/hr with an average density of approximately 13 lb/ft$^3$, but greater or lesser rates also may be used. The system can be configured to be operated at a carpet flow rate delivering approximately 15,600 lb/hr or other rates. Of course it is contemplated that multiple carpet waste composition mechanical separation lines can be used to enhance the overall output of the biomass fuel produced by an individual carpet waste composition mechanical separation line, which is described and illustrated herein for convenience. It is appreciated by one of skill in the art that the carpet waste composition 10 can comprise carpet waste materials having varying bale BTU averages. As such, it is contemplated that bales of the carpet waste composition 10 can be selectively fed into the system such that the first combustible stream 12 generated by the system can be substantially constant or similar such that a desired average BTU value within the first combustible stream is maintained.

The bale in feed conveyor 20 is configured as a mechanical conveyance system to deliver and position the carpet bales appropriately for movement into a first shredder 25. The first shredder 25 may break up the bales of carpet and cut the carpet waste composition 10 into smaller pieces. It is contemplated that the first shredder 25 can either shred, tear, cut, or grind the fabric material to reduce the size of the pieces of fabric material. In one aspect, it is contemplated that the shredder 25 can break up the straps/wire of the bales and at least a portion of any metallic urban debris in preparation for its later downstream removal. In one exemplary aspect, and not meant to be limiting, the first shredder can be a SSI model Q140 HD (75-500 HP) shredder. However, other types of devices capable of "sizing" or reducing the size of the pieces of carpet waste material by shredding, cutting, tearing, or grinding also can be used. In one non-limiting aspect, the exemplified SSI shredder is a four shaft shear shredder that is configured to shear or reduce the carpet waste materials into sizes that are less than about 10 in$^2$, less than about 5 in$^2$; less than about 3.5 in$^2$; or preferably less than about 2.5 in$^2$.

Subsequently, the reduced material produced by the first shredder 25 can be conveyed to a vibratory separator 30, such as, for example or without limitation, a vibrating screen. In one aspect, it is contemplated that the reduced material can be conveyed by a draglink conveyor 28, such as, for example and without limitation, an inclined draglink conveyor, to the vibratory separator 30, which can be optionally elevated with respect to the first shredder. The vibratory separator 30 is configured to vibrate the reduced material and to initially start the process of separating the mechanically separable components of the carpet waste composition. In the vibratory separator, at least a portion of the reclaimed inorganic filler composition and accumulated post-consumer dirt can be separated from the carpet waste composition that enters the vibratory separator and is directed into the first waste stream 16.

The remaining carpet waste composition exiting the vibratory separator 30 is subsequently directed into an air separator 35 that is configured to separate at least a portion of the heavy urban debris materials that were otherwise trapped within the carpet waste materials that were delivered to the system 100 from the desired carpet waste composition. In one exemplary aspect, and not meant to be limiting, the air separator 35 can be a Forsberg 86 Inch Air Leg air separator that is configured to operate with a continuous air flow loop. In this exemplary aspect, air can flow up and carry the lighter materials, i.e., the reduced size carpet waste materials, and allow the heavy urban debris, such as metal pieces, and the like, to fall to a heavy waste storage unit. In a further aspect, it is contemplated that oversized and fused carpet can also be removed in the air separator 35 and directed to the heavy waste storage unit. Optionally, other types of devices capable of separating heavy or metallic materials from the carpet waste composition exiting the vibratory separator, such as, for example and without limitation, industrial magnets and the like, can be used instead of, or as a supplement to, the air separator. It is contemplated that at least a portion of the lightest components of the carpet stream can become entrained in the recirculating air stream, be removed in a cyclone separator, and be injected into the first combustible stream 12 before reaching the fuel storage unit 13.

The carpet waste composition exiting the air separator 35 is subsequently directed into second shredder 40 for further reduction of the carpet waste composition to a reduced size. In one exemplary aspect, and not meant to be limiting, the second shredder 40 can be a Vecoplan RG 70-XL-T shredder. However, other types of devices capable of "sizing" or reducing the size of the pieces of carpet waste material to the desired size by shredding, cutting, tearing, or grinding also can be used. In one non-limiting aspect, the exemplified Vecoplan shredder is a grinder type shredder that has a hydraulic ram that is configured to push the carpet waste composition exiting the air separator 35 into contact with a rotating drum having blades that are configured to shred the carpet waste composition and to pass the appropriately sized materials through a screen having a plurality of predetermined sized apertures. In one aspect, the exemplified Vecoplan shredder is configured to shear or reduce the carpet waste materials into sizes that are less than about 2 in$^2$; less than about 1 in$^2$; or preferably less than about 0.75 in$^2$.

The reduced size carpet waste composition exiting the second shredder 40 is subsequently directed into final step separator 45 for final separation of at least a portion of the organic component from the carpet waste composition 10 to thereby produce a reclaimed inorganic filler composition at least substantially free of the organic component. In this step, the carpet waste composition produced by the second shredder 40 is further reduced or torn in the final step separator 45 into small shreds or strings and the majority of the remaining reclaimed inorganic filler composition at least substantially free of the organic component is separated from the combustible organic component and is directed into the first waste stream 16 for storage therein the first waste storage unit 17. In one exemplary aspect, and not meant to be limiting, final step separator can be a Signal Machine 8 Step separator, which is configured with a plurality of rotating drums in operative cooperation with a screen sized to allow the reclaimed inorganic filler composition at least substantially free of the organic component to pass therethrough and into the first waste stream 16.

The remaining organic component of the carpet waste composition that exits the final step separator 45 forms the first combustible stream 12 and can, in one aspect, be conveyed to the boiler 70 for generation of energy. Optionally, however, the first combustible stream 12 can be conveyed to the fuel storage unit 13 which is configured to hold a quantity of the fuel biomass to ensure adequate and timely supply of fuel to the boiler 70. In one aspect, it is contemplated that the materials forming or otherwise entrained in the first combustible stream 12 can be conveyed to the top of the fuel storage unit via a pneumatic conveyor. In one aspect, the fuel storage unit has an internal volume sufficient for at least 10 hours, at least 15 hours, and preferably at least 20 hours of operation of the boiler 70 of the system 100. In another aspect, the internal volume of the fuel storage unit 13 can hold at least 110,000 lbs, at least 120,000 lbs, at least 130,000 lbs, and preferably at least 140,000 lbs of the biomass fuel within the first combustible stream.

In a further aspect, it is contemplated that at least one of, and optionally all of, the inclined draglink conveyor 28, the vibratory separator, the second shredder 40, and the final step separator 45 can be at least partially hooded. As one skilled in the art will appreciate, when the carpet waste composition 10 is shredded or sized as described above, a considerable amount of airborne dust, dirt, fines, and the like can be created. In a further aspect, it is contemplated that the system 100 can further comprise a ventilation subsystem 50 that can be configured to move/recycle air passing through the hooded portion of the system 100 and to direct the particle laden air to a conventional cyclone, drum filter or bag house 55. The cyclone, drum filter or bag house 55 can be configured to capture a large portion of the very fine dust that may be created as a result of shredding or sizing the carpet. Optionally, it is contemplated that other types of devices capable of separating the produced fine dust can be used. The captured dust can then be moved or otherwise conveyed to the first waste storage unit 17.

In one embodiment, the first waste storage unit 17 can be a substantially cylindrical silo that is configured with a rotating sweeper arm in the bottom portion of the silo that is operably coupled to an auger to allow for unloading of the reclaimed inorganic filler composition at least substantially free of the organic component. In one aspect, it is contemplated that the materials forming or otherwise entrained in the first waste stream can be conveyed to the top of the first waste storage unit via a pneumatic conveyor. In one aspect, the first waste storage unit 17 has an internal volume sufficient for at least 15 hours, at least 20 hours, and preferably at least 25 hours of operation of the system 100. In another aspect, the internal volume of the first waste unit can hold at least 130,000 lbs, at least 150,000 lbs, at least 170,000 lbs, and preferably at least 180,000 lbs of carpet fines.

Figure 3:
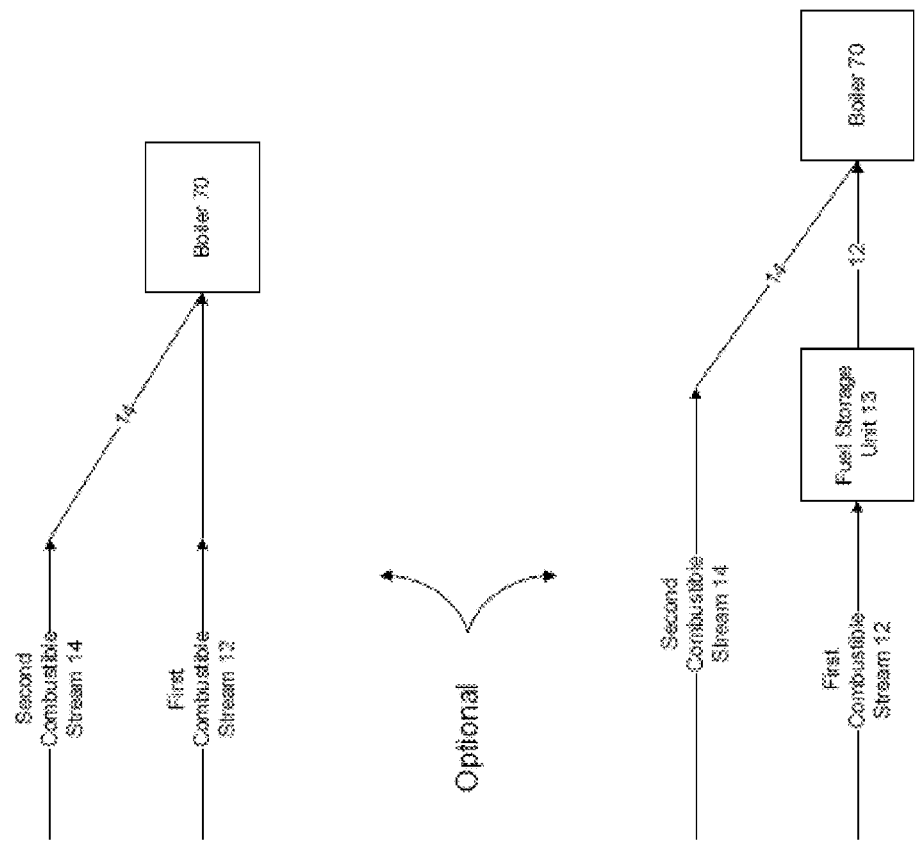
FIG. 3 is a schematic representation of a second stage of the exemplary method and system of FIG. 1, showing the selective storage and delivery of the first combustible stream to a boiler for energy production and showing the optional selective delivery of a second combustible stream of combustible material to the boiler for energy production.

Referring to FIGS. 2 and 3, and as noted above, it is optionally contemplated that the first combustible stream 12 can be mixed with another combustible stream, comprised of carpet waste materials of a higher relative BTU/lb value to enhance the overall BTU/lb value of the carpet waste biomass fuel delivered to the boiler 70. In this aspect, a second combustible stream 14 formed from a second organic fuel component can be selectively added to the first combustible stream 12 before introduction into the boiler 70. Optionally, the second combustible stream 14 can be selectively introduced into the boiler 70 without being previously introduced or mixed with the first combustible stream 12. In this aspect, it is contemplated that the second organic fuel component will have a higher relative BTU/weight content than the portion of the organic component from the carpet waste composition 10 that forms the first combustible stream 12. In one exemplary aspect, the second organic fuel can comprise post consumer or post industrial fibers, such as, for example and without limitation, shear lint, elutriated fiber, and the like.

In one aspect, it is contemplated that the second organic fuel component, which can comprise, without limitation waste post consumer or post industrial fibers, can be delivered to the system in bales as described above and supplied to a fiber line shredder 60 that is configured to reduce the bales to its constituent fibers. In one exemplary aspect, and not meant to be limiting, the fiber line shredder can be a Vecoplan RG 62/125-XL Shorty shredder. Of course, it is contemplated that the fiber line shredder 60 can comprise any conventional shredder device that is capable of "sizing" or reducing the size of the bales of the second organic fuel component to the desired size by shredding, cutting, tearing, or grinding. The reduced second organic fuel component exiting the fiber line shredder 60 forms a second combustible stream 14 that has a higher BTU/weight then the waste composition forming the first combustible stream 12. In one exemplary aspect, the second organic fuel component that forms the second combustible stream has a BTU/lb value that is between about 9,500 BTU/lb to about 13,000 BTU/lb, about at least 9,000 BTU/lb, and preferably about at least 12,000 BTU/lb.

In a further aspect, it is contemplated that the speed of delivery of the first combustible stream 12 to the boiler 70 can be selectively controlled to effect or otherwise maintain the at least one boiler control parameter within a desired range. In various aspects, the boiler control parameters can include, without limitation, pressure, temperature, and the like. Optionally, the fuel storage unit 13 can further comprise at least one level sensing sensor therein the fuel storage unit. In one aspect, it is contemplated that the level sensing sensor can provide a control indication to operators of the system to effect speed of the delivery of the first combustible stream 12 to the fuel storage unit 13. Optionally, the level sensing sensor can be coupled to a control processor to provide feedback control on the relative speed of the delivery of the first combustible stream 12 to the fuel storage unit 13 in order to maintain the level of available fuel within the fuel storage unit at a desired level.

Figure 4:
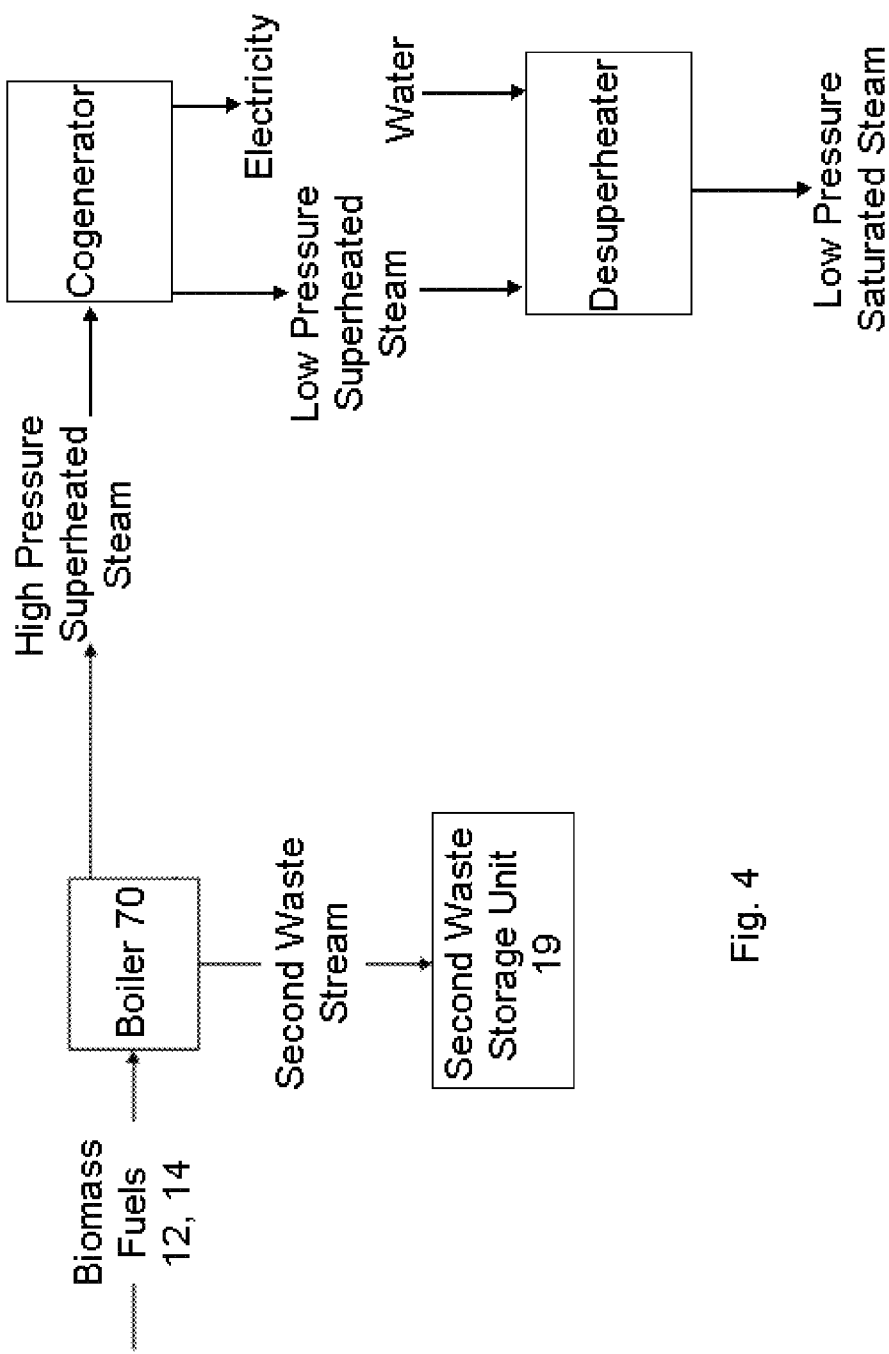
FIG. 4 is a schematic illustration of a third stage of the exemplary method and system of FIG. 1, showing exemplary and optional energy outputs from the boiler and the generation of a second waste stream.
Figure 5A:
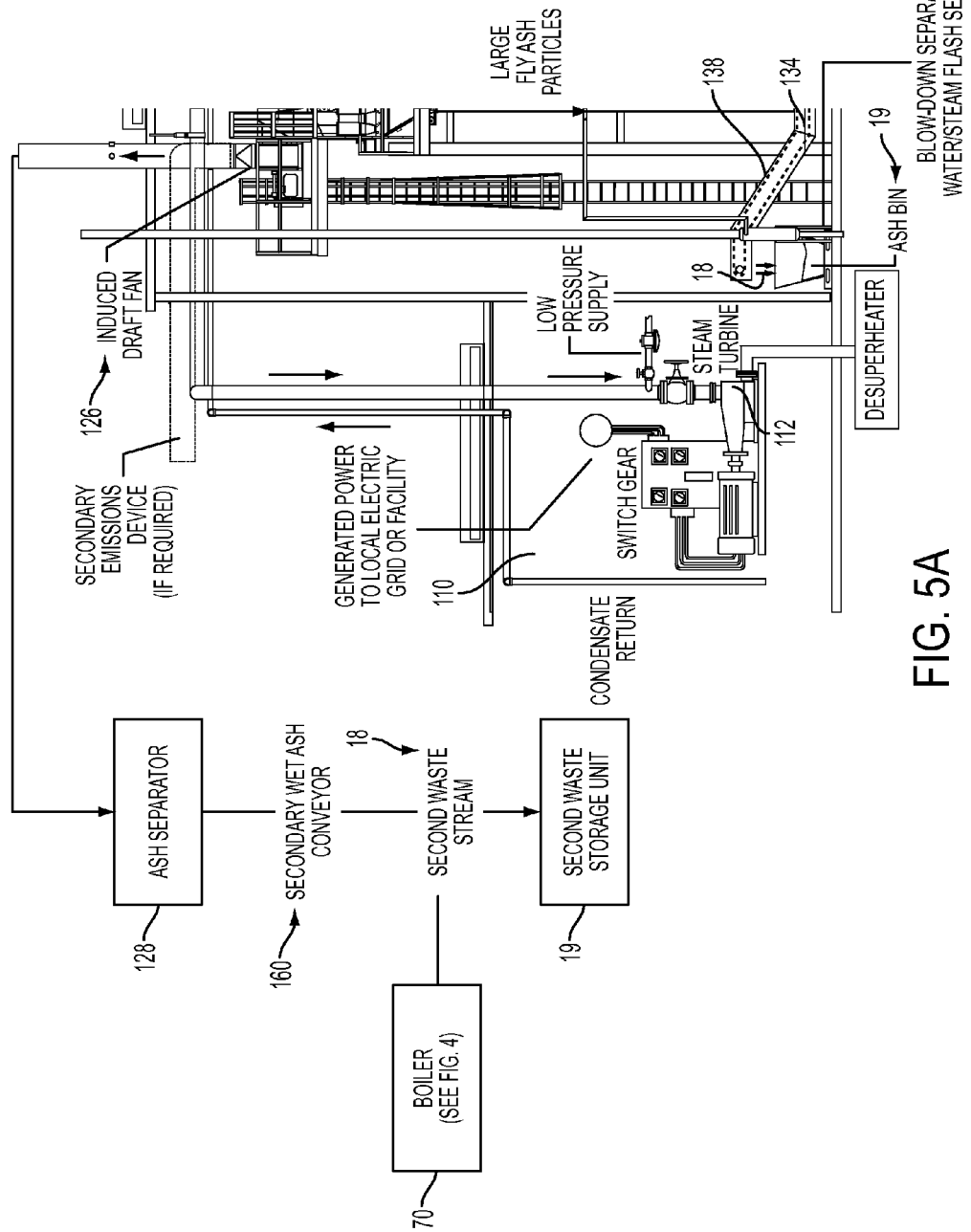
FIGS. 5A and 5B are schematic illustrations of an exemplary boiler and showing exemplary gasification, burn, and recovery processes occurring during the generation of power using carpet waste compositions as fuel.
Figure 5B:
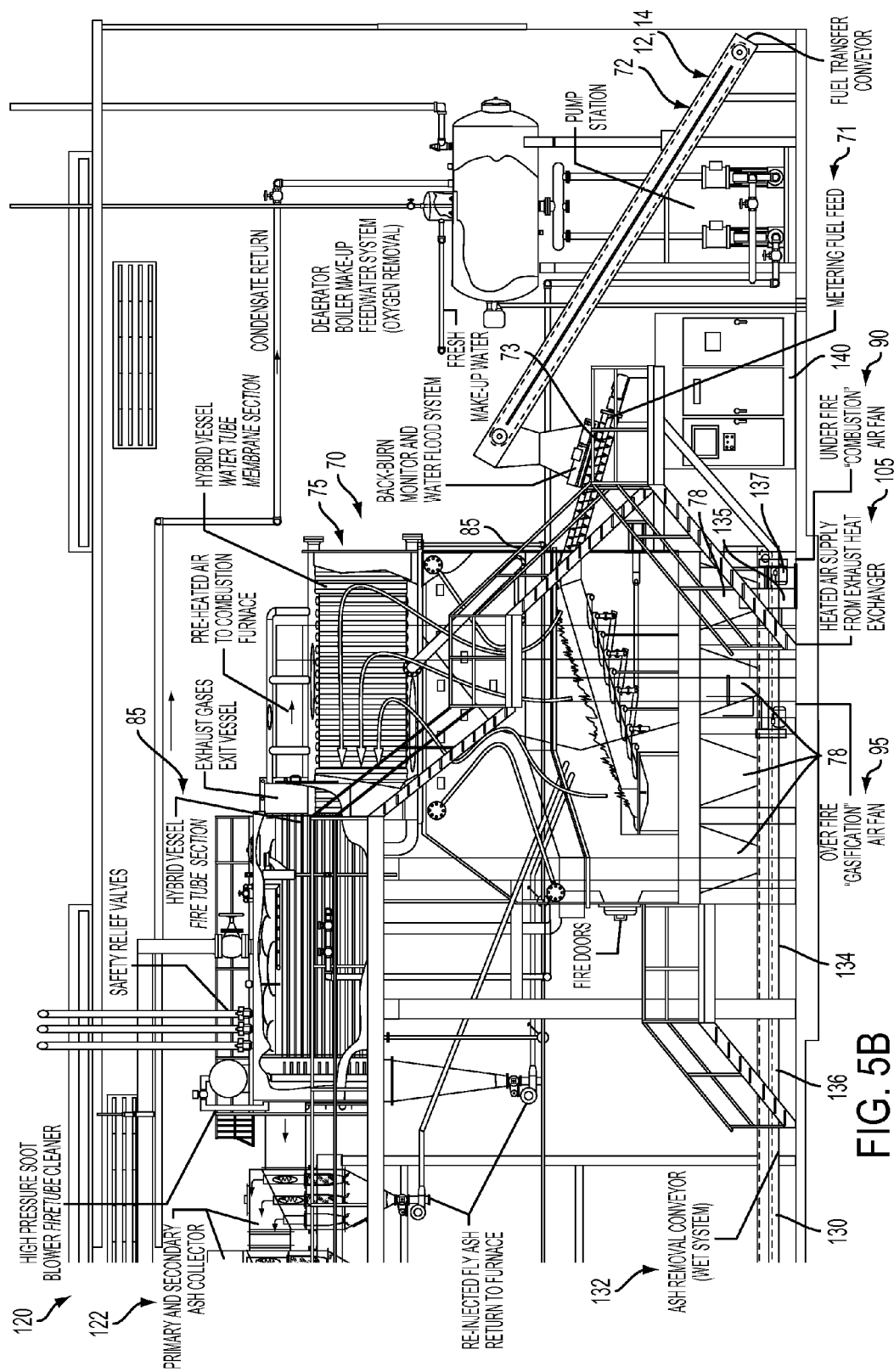
Figure 6A:
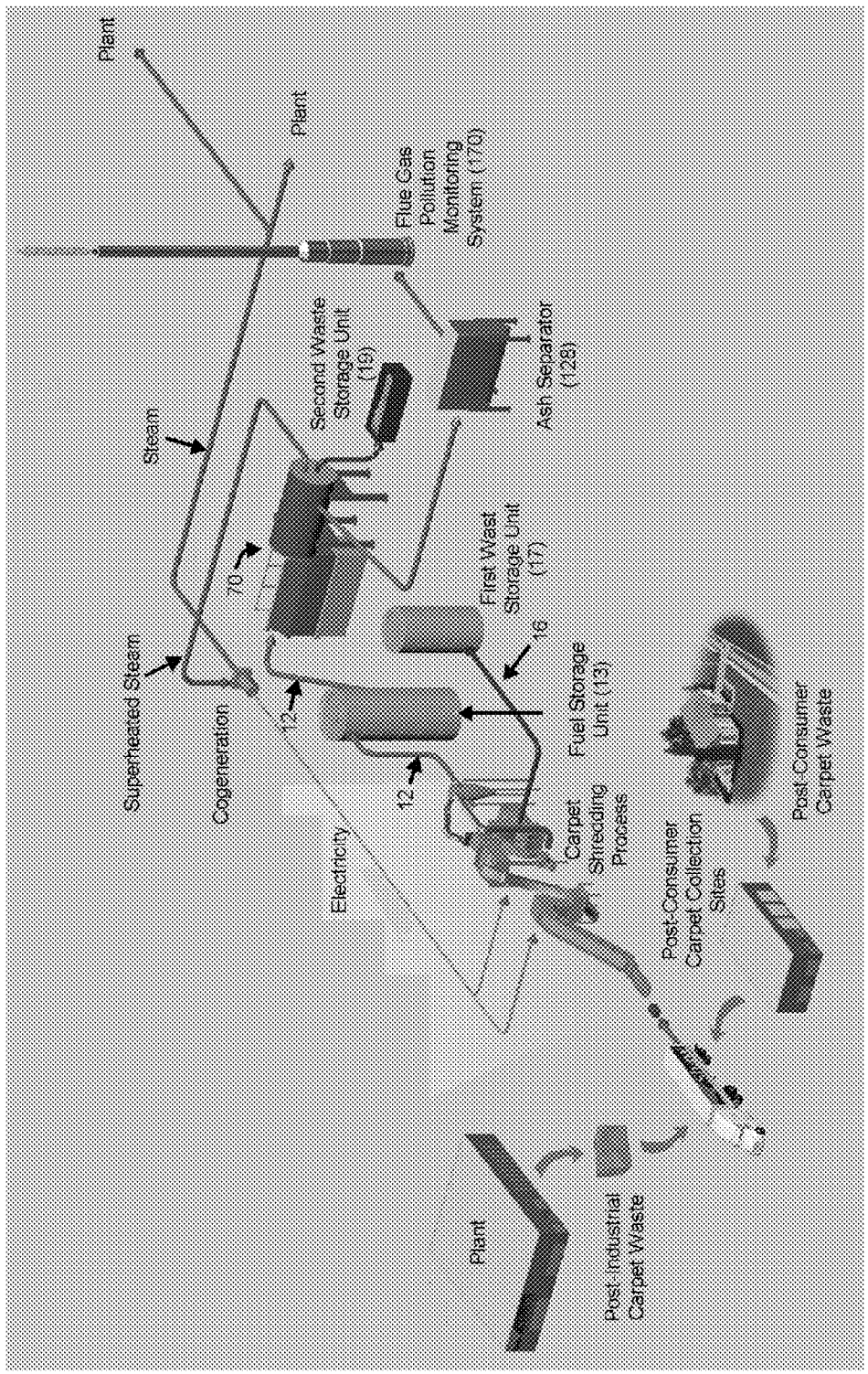
FIG. 6A is a schematic illustration of an exemplary method and system for generating energy from carpet waste and for storing waste products generated through the exemplary method and system.
Figure 6B:
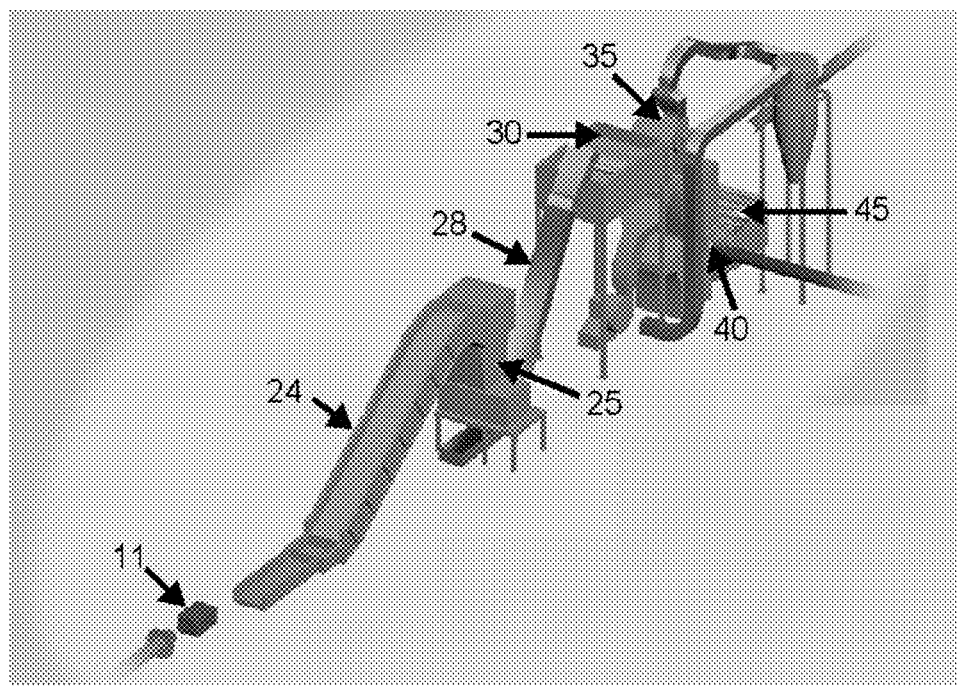
FIG. 6B is a detailed illustration of the mechanical process for separating at least a portion of the organic component from a carpet waste composition and to provide a reclaimed inorganic filler composition at least substantially free of the organic component. In this schematic, the separated portion of the organic component from the carpet waste composition forms a first combustible stream and the separated reclaimed inorganic filler composition forms a first waste stream.

Referring generally to FIGS. 4, 5A and 5B, exemplary schematic illustrations are provided that show exemplary and optional energy outputs from the boiler 70 and the generation of a second waste stream 18. In addition, exemplary gasification, burn, and recovery processes occurring within an exemplary boiler during the generation of power using carpet waste compositions as fuel are schematically illustrated.

Exemplary energy outputs include, without limitation, electricity, high pressure steam, low pressure steam, saturated steam, wet steam, superheated steam, and the like. In one exemplary aspect, and not meant to be limiting, the boiler 70 can be a Hurst 1500 Horsepower Biomass Fueled boiler. However, other types of devices capable of burning the supplied first combustible stream and, optionally, the second combustible stream, can be used. In one aspect, the boiler 70 can have a chapel section 75, a grate section 80, a fire tube section 85, an under fire air fan 90, an over fire air fan 95, and a flue gas recirculation fan 105. The boiler 70 can also comprise a wet ash conveyor 130 and a flue gas pollution monitoring subsystem 140. As one will appreciate, it is contemplated that the boiler 70 can have other configurations, including those with fewer or additional components.

In one exemplary aspect, the Hurst boiler can produce approximately 50,000 pounds per hour of superheated steam from the boiler, but other capacities also may be provided. The chapel section 75 has water filled tubes that are welded together in an upper portion of the chapel section chamber. The walls of the lower portion of the chapel section 75 are at least partially lined with a refractory material. The lower portion of the chapel section houses the grate section 80, which, for example and without limitation, can comprise a plurality of stepped reciprocating and/or fixed grates upon which the combustible fuel is heated for combustion. The fire tube section 85 is coupled to and in communication with the upper portion of the chapel section chamber and has a plurality of tubes that are configured to pass through a tank of water.

As one skilled in the art will appreciate, hot flu gases are passed through the tubes to affect the heating of the water in the tank. In one exemplary aspect, the tubes in the bottom portion of the tank feed flue gas to the superheater and the tubes in the upper portion of the tank take the flue gas from the superheater to the boiler exit.

As shown in FIGS. 4, 5A and 5B, the first, and optionally, the second, combustible waste streams 12, 14 are delivered, for example and without limitation, by a boiler feed conveyor 72 to at least one boiler metering bin 71. The boiler feed conveyor 72 can comprise at least one of a conventional belt conveyor, an auger, and the like. In another aspect, the boiler feed conveyor 72 can comprise a fire-prevention subsystem coupled to a source of pressurized water that is configured to selectively release the water onto the waste fuel stream in response to a sensed elevated temperature. As one of skill in the art will appreciate, the boiler feed conveyor 72 is sized so that a desired level of a combustible waste composition fuel stream can be selectively supplied to the boiler 70 as desired and/or necessary. The boiler metering bin can further comprise at least one bin level sensor 73 that is configured to control the feed of the respective combustible waste composition fuel streams. In one aspect, the bin level sensors can be configured to control the feed to the boiler by sending control signals to a speed control that governs the respective speed of the boiler feed conveyor 72. Each boiler metering bin optionally also comprises a feed auger that is configured to selectively deposit the waste biomass fuel onto the grate section 80 of the boiler 70. In this aspect, the bin level sensor of each boiler metering bin can be configured to control the selected feed of the waste biomass fuel from the boiler feed conveyor 72 to the respective at least one boiler metering bin such that the level of fuel within each boiler metering bin 71 is maintained at a level commensurate with the desired feed rate of the boiler 70.

In one aspect, it is contemplated that the delivered combustible waste stream is combusted in two steps. Initially, as the waste biomass fuel is deposited on the grate section 80, heat from some of the burning causes gasification of at least a portion of the unburned fuel. As one will appreciate, the gasification process happens on the grate at a lower temperature to protect the structural integrity of the grate itself. Subsequently, the high temperature synthesis gas generated by the gasification can be burned at a higher temperature in the upper portion of the chapel section 75 of the boiler 70. Within the grate section 80, at least every other section of the inclined grate can be configured to articulate in a reciprocating motion to affect the sequential downward tumbling of the fuel as it is burned and consumed.

In one aspect, the under fire air fan 90 supplies air under the grate section 80. In operation, air flows through the grate section 80 and is used in the gasification of at least a portion of the fuel deposited thereon the grate. The over fire air fan 95 supplies air within the chamber of the chapel section 75 intermediate the upper and lower portions of the chapel section. In operation, the air supplied by the over fire air fan is used to enhance the combustion of the generated high temperature synthesis gas.

Optionally, and as shown in FIGS. 5A and 5B, the boiler 70 can be operatively coupled to a co-generation unit 110 and a fly ash recovery subsystem 120. In various aspects, it is contemplated that the fly ash recovery subsystem 120 can optionally have at least one fly ash cyclone 122, an economizer 124, an induced draft fan 126, and an ash separator 128, which can comprise, for example and without limitation, a fly ash bag house, a wet electrostatic precipitator (WESP), and the like. Optionally, the boiler 70 can also comprise the flue gas recirculation fan 105, which is configured to receive a portion of the generated flue gas after passage through the at least one fly ash cyclone 122 and to deliver the hot flue gases to an inlet plenum for at least one of the respective over fire and under fire fans 95, 90.

In one aspect, at least a portion of the superheated steam generated by the boiler 70 can be coupled to a turbine 112 of the co-generation unit 110. In another aspect, it is contemplated that substantially all of the superheated steam generated by the boiler 70 can be coupled to the turbine 112 of the co-generation unit 110. In one exemplary aspect, and not meant to be limiting, the turbine can be a Skinner model S-28 turbine. This exemplary turbine requires approximate 800 kWh of supplied steam energy to drive the turbine and its associated and coupled gear reducer and New Age Stamford model 450-15473E generator. The exemplary generator can produce approximate 750 kWh of electrical energy that can be used in an associated processing step or can be directed into a power grid for desired use internally or externally. In one exemplary aspect, the turbine 112 can accept superheated steam at about 400 psi and about 600° F. and can exhaust it at about 125 psi and 450° F. In this aspect, the 400 psi steam feed has approximately 150° F. of superheat and the turbine exhaust has approximately 85° F. of superheat. In one aspect, the superheated steam exiting the turbine can be passed through a desuperheater to convert the superheated steam to a saturated steam. In this aspect, it is contemplated that the desuperheating step can produce approximately 7,500 pounds of saturated steam per hour. It is further contemplated that reverse osmosis water is inserted into the desuperheater, which causes the reverse osmosis water to boil and results in saturated steam that is exemplarily, and without limitation, at about 125 psi and about 365° F. As one will appreciate, the steam passing through and powering the turbine is kept superheated to ensure that the steam is "dry" as wet steam could erode the turbine blades. Of course, it is contemplated that other turbines with other capacities also may be provided as desired.

In one aspect, the waste ash that results from the burning of the first combustion stream 12 and, optionally, the second combustion steam 14, comprises calcium oxide, which results from the thermal decomposition of limestone that is typically used as a filler in the latex adhesive that is conventionally used to bind the tufted part of a carpet greige good to a backing material. In an exemplary aspect, it is contemplated that the waste ash can also comprise aluminum oxide from the thermal decomposition of aluminum hydroxide, which is used as a flame retardant and latex filler, and antimony oxide, which is used as a flame retardant in an extruded polymer fiber. In one exemplary aspect, the remaining components, other than limestone, of the combustion streams can comprise, without limitation, at least one of carbon, hydrogen, oxygen, and nitrogen. During the combustion process, the available carbon, hydrogen, and nitrogen are oxidized to carbon dioxide, water vapor and nitrogen oxide, which are all gases. The combustion process, which absorbs heat, also results in the limestone decomposing into carbon dioxide and calcium oxide, a solid, when the combustion process temperature is above about 825° C.

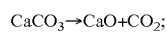

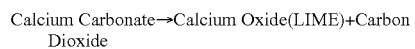

Calcium Carbonate→Calcium Oxide(LIME)+Carbon Dioxide

As one will appreciate, calcium oxide, e.g., lime, reacts vigorously with water as it hydrates into calcium hydroxide, e.g., slaked lime. If left the waste ash comprising calcium oxide is left exposed to atmospheric humidity, the heat of the hydration process will quickly raise the temperature of the waste ash to a degree that can ignite any nearby combustible material, such as, for example and without limitation, any unburned carbon that is present in the waste ash.

In a further aspect, the boiler 70 has at least one discharge ash chute 78 positioned underneath the chapel section 75 of the boiler 70 and in communication with the interior of the chamber of the chapel section. The wet ash conveyor 130 is positioned at least partially underneath the chapel section of the boiler 70 and includes a partially enclosed continuous drag-link conveyor 132. The drag-link conveyor is configured to continuously move within a trough 134 than has a horizontal section 136 that is filled with water to a desired level. In one aspect, because it is operated below atmospheric pressure and as one skilled in the art will appreciate, the distal end of the at least one discharge ash chute 78 is positioned beneath the top level of the water within the basin to form the bottom seal on the boiler 70. This allows the water to rise up and into the interior volume of the at least one discharge ash chute. In an additional aspect, it is contemplated that the wet ash conveyor 130 can further comprise an active water level control system 135 that is configured to maintain the water level within the horizontal section of the basin at the desired level. This can help insure that the ash falling in to the water within the trough doesn't become a dry powder as the water within the trough is turned into steam in the hydration process.

In operation, at least a portion of the ash resulting from the burning of the supplied biomass fuel to the grate section is allowed to fall through the grates and subsequently through the at least one discharge chute 78 and into the water contained within the trough of the wet ash conveyor 130. The hot waste ash, which is typically over about 400° F. itself when it enters the water, immediate starts to hydrate and generate additional heat, which boils the water. The water temperature in the trough of the wet ash conveyor is maintained at a desired boiling point of the water. In another aspect, the wet ash conveyor 130 can be vented so that the atmospheric steam generated in the hydration process is vented to the atmosphere. In another aspect, it is contemplated that the trough can comprise at least one conventional cooling jacket in operable heat transfer communication with the surface of the trough 134. In this aspect, the heated return water from the cooling coil can be used to produce hot water for use, such as space heating, in an adjacent facility.

Optionally, the wet ash conveyor can be configured to drag or otherwise urge the wet ash to the end of the boiler building and to continue up an inclined dewatering section 138 of the trough 134 to partially dewater the waste ash and to deposit the formed second waste stream 18 in a sump. The second waste stream 18 can then be conveyed to a macerator and pumped to a dewatering system. It is contemplated that the second waste stream 18 can be pumped to the dewatering system using a conventional pump, such as, for example and without limitation, a 4-inch Schwing-Bioset concrete pump. Optionally, the dewatering system can comprise a conventional rotary drum vacuum filter, such as, for example and without limitation, a Komline-Sandersin 3 foot by 6 foot rotary drum vacuum system. The wet ash resulting from the dewatered second waste stream 18 or that removed from the rotary drum vacuum filter can be distributed in a transportation trailer by a traveling conveyor for pickup and transportation to a separate disposal or recycling facility, such as, for example, the second waste storage unit 19. It is contemplated that the liquid produced by the exemplary dewatering system or the rotary drum vacuum filter can be recycled back to the wet ash conveyor. Alternatively, the liquid produced by this dewatering system can be used for neutralization of an acidic waste stream. In one aspect, the waste ash is allowed to remain within the trough 134 for a predetermined residence time to enable the substantial hydration of the waste ash and its transformation to the inert slaked lime. In one exemplary use of the inert slaked lime, the basic calcium hydroxide, which has a PH of approximately 12, is slightly soluble in water and can be drawn off to neutralize acids or adjust PH levels in waste streams. Because of the presence of other metallic hydroxides, it is contemplated that the pH of the waste ash can be as high as 13.5 and can increase with decreasing temperature.

In one aspect, it is contemplated that the dewatering section of the wet ash conveyor is configured to allow for sufficient water to drain from the wet ash/water mixture forming the second waste stream 18 so that the wet ash/water mixture is maintained at a viscosity sufficient for the deposited material will self-level in the second waste storage unit 19 for ease in transportation. In one aspect and without limitation, the preferred viscosity or consistency is preferably similar to the consistency of wet concrete.

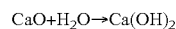

Calcium Oxide(Lime)+Water→Calcium Hydroxide (Slaked Lime)

It is contemplated that the majority of waste ash drops directly off the grate section and into the underlying wet ash conveyor 130. However, additional waste fly ash is airborne within the system 100 and is collected by the fly ash recovery subsystem 120. In one aspect, the fly ash recovery subsystem 120 can optionally comprise at least one of the at least one fly ash cyclone 122, the economizer 124, the induced draft fan 126, and the ash separator 128.

In one aspect, the larger particulate fly ash is collected by the at least one fly ash cyclone 122. The captured larger particulate fly ash can optionally be directed, or otherwise fed, to at least one of the chamber of the chapel section 75 of the boiler 70, the wet ash conveyor 130, and/or a secondary wet ash conveyor 160. Alternatively, the captured larger particulate fly ash can be collected separately for another use. The ash separator 128 can be configured to capture the fine particulate fly ash matter. In one exemplary aspect, the ash separator 128 can comprise, without limitation, at least one of a bag house or a WESP.

In systems utilizing a WESP as the ash separator 128, the WESP can comprise at least one of a quench chamber with demister (at saturated flue gas temperature), a primary particulate precipitation chamber, a secondary nitrogen oxide scrubber chamber, and a secondary particulate precipitation chamber. It is contemplated that the WESP can be a conventional WESP, such as, for example and without limitation, an Eisenman WESP-2F, dual-flow type 1 WESP. In another aspect, the calcium oxide and other particulates that are washed, scrubbed, and collected/washed off of the precipitator collection plates can be hydrated and suspended in the WESP sump liquid. In an additional aspect, the excess water with the suspended solids can be "blown down" from the sump such that the stream is fed to the wet ash conveyor. It is contemplated that even though carbonic acid and nitric acid are formed from the chemical reaction of carbon dioxide and nitrogen oxides with water, the quantity of these acids is insufficient to lower the pH of the WESP sump liquid in the "blow down" stream.

Carbonic Acid Formation

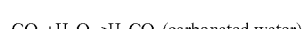

Nitric Acid Formation

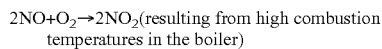(resulting from high combustion temperatures in the boiler)

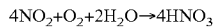

In systems utilizing a fly ash bag house as the ash separator 128, the fly ash bag house can comprise a flexible, fabric chamber, such as, without limitation, a fabric bag, which houses a fabric fan. In operation, the fine particulate fly ash is placed into communication with the exterior surface of the at least one chamber of the fly ash bag house. To recover the accumulated fly ash, the at least one chamber is quickly inflated with compressed air to knock the accumulated fly ash off of the exterior surface of the at least one chamber. The recovered fly ash can subsequently be communicated via conveyor to the secondary wet ash conveyor 160 for hydration as described above. In one aspect, it is contemplated that, after dewatering, the recovered slaked lime from the hydration of the waste fly ash recovered via the fly ash recovery subsystem 120 can form a portion of the second waste stream 18 and can be deposited in the second waste storage unit 19 with the materials recovered from the wet ash conveyor 130, which forms the remainder of the second waste stream 18.

In a further aspect, the boiler 70 can include the optional economizer 124 to enhance the overall efficiency of the system 100. For example, the optional economizer can use the hot stack gases to preheat the boiler feedwater. The economizer 124 can also be configured as a component of the fly ash recovery subsystem 120 and, in such a configuration, can cool the hot flue gas to a temperature that is suitable for the fabric material that forms the at least one chamber of the fly ash bag house 128. The economizer 124 can optionally be connected to the boiler fan.

Further, in another aspect, the induced draft fan 126 can also be configured as a component of the fly ash recovery subsystem 120 and, in such a configuration, can draw at least a portion of the flue gas out of the boiler 70 and can provide the necessary pressure to drive the flue gas, which contains the entrained fine fly ash, through the fly ash separator 128.

The system 100 can also comprise a flue gas pollution monitoring system 170 that is configured to do at least one of sample, monitor, calculate, record, and/or transmit nitrogen oxide (NOx) emissions of the system 100. In one aspect, the flue gas pollution monitoring system 170 can comprise a conventional sample probe 172 that is positioned in the exhaust stack of the boiler and that is in communication with a monitor processor for conventional analysis. In one exemplary aspect, the flue gas pollution monitoring system 170 can comprise a conventional Continuous Emissions Recording and Monitoring system (CERMS).

The first and second waste streams 18, 19 can be kept separate from each other or, optionally, can be subsequently combined together. By keeping the respective first and second waste streams separate, it is contemplated that the differing characteristics of the respective compositions of the first and second waste products, would allow for separate and distinct recycling opportunities. Furthermore, each of the respective first and second waste products may have individual value if kept separate. Accordingly, by moving and storing the individual waste products separately, the ability to sell, as well as more easily and cheaply dispose of, each waste product may be improved. For example and without limitation, it is contemplated that the recycling opportunity for the first waste product can comprise usage of the first waste product as a fuel source or filler for a cement manufacturing process, usage of the first waste product as a fuel source within the energy production processes described herein, usage of the first waste product as a source of calcium carbonate configured for blending with virgin calcium carbonate to produce recycled calcium carbonate products for industrial applications, substantially full combustion of the first waste product to produce ash for usage as a filler material for latex in the manufacturing of carpet, and the like. Similarly, the recycling opportunity for the second waste product can comprise, for example and without limitation, usage of the second waste product to solidify liquids, usage of the second waste product as a filler material for manufacturing of carpet, usage of the second waste product (in dry form) to form an $N_2$ blanket to avoid exothermic reactions (in dry form), usage of the second waste product as a polymer filler in the spinning of a polymer fiber, usage of the second waste product as a flame retardant, usage of the second waste product as a neutralization agent in other waste sources, such as, for example and without limitation, wastewater.

Optionally, if the two waste streams generated by the system 100 are subsequently joined, it is preferred that the respective first and second waste products be isolated from each other for a period of time for a number of practical reasons. For example, the second waste stream 18 resulting from the hydration process is usually relatively hot at the time it enters the second waste storage unit 19. If the second waste stream 18 was allowed to intermingle with the first waste stream when the second waste stream was still hot, the second waste stream could melt a significant amount of the carpet fines forming the first waste stream. After such a mixture cools, a large block of hardened concrete-like material in the storage unit could result. However, it is contemplated that noted potential combination of the two waste stream generated by the system 100 can be desirable. Optionally, it is contemplated that a portion of either the first and/or second combustion streams can be added to the combination of the first and second waste streams generated by the system 100 to form a third, more desirable waste stream that has a higher the BTU value of the formed waste product. Such a formed waste product could, for example and without limitation, be used as a kiln fuel for the cement industry. In this aspect, the calcium oxide in the thermal decomposition of the calcium hydroxide second waste stream and the calcium oxide from the thermal decomposition of the calcium carbonate in the first waste stream can be used as a raw material in the manufacture of Portland cement.

Accordingly, the use of the system 100 as described herein can reduce the amount of air emissions associated with the production of steam. Additionally, the use of carpet waste as a biomass fuel may provide other environmental benefits. For example, as previously noted, significant value may be extracted from carpet waste in the ultimate form of application steam which may reduce the dependency on other forms of energy, such as coal and natural gas. Due to the reduction in the volume of un-recycled carpet waste, the amount of landfill resources expended on carpet waste disposal may be reduced. Moreover, the disposal of carpet waste products generated from gasification may be easier and less costly. Therefore, the amount of money spent on other fuels currently being used to produce steam is reduced, the landfill costs associated with carpet waste are lowered, and the cost of disposal of gasification waste products is decreased.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is in C or is at ambient temperature, and pressure is at or near atmospheric.

The following example is related to a direct combustion process to make steam and electricity for carpet manufacturing in accordance with the foregoing description. The carpet input is 47% post-consumer and 53% post-industrial styrene butadiene latex-backed broadloom. Using a life cycle boundary to include all material inputs and outputs as well as all life cycle energy, the exemplary process produces 36,500 lb steam/hr (365° F., 120 psig) and 600 kW of electricity for use in carpet manufacturing. The energy efficiency is currently estimated (based on design and start-up) to be 70%-80%. The exemplary process substitutes barrels of carpet for barrels of fossil fuels and on an annual basis saves about 65,000 barrels of oil or 360 million standard cubic feet of natural gas. In addition, about 36 million pounds of limestone/year do not have to be removed from the earth.

The following data evaluates steam production from recovered carpet, to be used directly in a carpet mill (for such steps as dyeing and finishing, important consumer aspects) as well as some cogenerated electricity for use in the process. The steam production is from the direct fuel combustion of the high heat value fraction of the post-industrial (PI) and post-consumer (PC) carpets. This fuel fraction separated after grinding is about 50 wt % of the overall carpet input. The other 50 wt % of the overall carpet input is a largely inorganic fraction of the styrene butadiene latex-backed broadloom. The inorganic fraction is typically used (after blending) as byproduct filler in carpet thus replacing calcium carbonate, a smaller energy credit, but nonetheless maximizing all forms of material and energy recovery from post-industrial carpet. The steam and fuel values lead to a direct reduction in fossil fuel depletion (whether domestic or foreign) principally by avoided use of natural gas and coal.

The carpet fuel preparation involves shredding and screen separation in which about 50 wt % is fines and 50 wt % becomes carpet fuel. The carpet fines are further screened in which about 15 wt % is over-sized and landfilled (if a beneficial reuse cannot be implemented). The balance is stored and taken to a vendor to be reground with virgin calcium carbonate and sold as a filler for such products as carpet. The carpet fuel stream is combusted and about 23 wt % is ash which is collected and landfilled.

The exemplary process uses 53% post-industrial styrene butadiene latex-backed broadloom and 47% post-consumer styrene butadiene latex-backed broadloom as a mixed fuel. Representative styrene butadiene latex-backed broadloom carpet has been evaluated using life cycle tools as a part of the Carpet and Rug Institute (CRI) effort to provide Life Cycle Inventory (LCI) data for U.S. carpets. The carpet mill assembles six to eight materials, adds energy, and produces a wide variety of carpet products, as shown in Table 1.

TABLE 1

Carpet mill inputs to produce one square yard of representative styrene butadiene latex-backed broadloom carpet

| Components of inputs to carpet manufacturing | Representative styrene butadiene latex-backed broadloom |
|---|---|
| Electrical energy, MJ/sy | 0.68 |
| Steam energy, MJ/sy | 1.2 |
| Curing natural gas, MJ/sy | 4.2 |
| Nylon, kg/sy | 0.84 |
| Styrene butadiene copolymer 50 mole % S, kg/sy | 0.217 |
| Polypropylene, kg/sy | 0.187 |
| Calcium carbonate, kg/sy | 0.506 |
| Aluminum hydrate, kg/sy | 0.255 |
| Pigment, kg/sy | 0.0017 |

The total input of carpet is 84 million lb/yr on an as is basis (7 wt % moisture). The carpet recycling plant is designed for 48 weeks/yr, 24 hr/d, 5 d/wk or 5,760 hr/yr which is then about 14,600 lbs/hr as the overall plant carpet input. This fuel is used to supply the steam demands for a nearby carpet mill, which is targeted as 50,000 lbs/hr steam at 120 psig (8.2 atm) and 365° F. (185° C.). The exemplary process also generates about 600 kW of electricity (2,160 MegaJoules (MJ)/hr).

The recycled carpet stream (PI and PC) is shredded and ground then separated into two major streams, carpet for fuel (50 wt %) and carpet fines (50 wt %). The compositions of recycled carpet, carpet as fuel, and carpet fines are listed in Table 2.

TABLE 2

Compositions of carpet recycle stream, carpet as fuel, and carpet fines (wt % of each respective stream)

|  | Filler (calcium carbonate and aluminum hydrate) | Styrene Butadiene Latex | Fiber (nylon 6 and polypropylene) | Dirt |
|---|---|---|---|---|
| Post Industrial Carpet (PI) (input 53 wt %) | 38 | 10 | 52 | 0 |
| Post Industrial Fuel | 20.45 | 3.8 | 75.75 | 0 |
| Post Industrial Fines | 61.34 | 11.4 | 27.26 | 0 |
| Post-consumer Carpet (PC) (input 47 wt %) | 30.4 | 8 | 41.6 | 20 |

TABLE 2-continued

Compositions of carpet recycle stream, carpet as fuel, and carpet fines (wt % of each respective stream)

|  | Filler (calcium carbonate and aluminum hydrate) | Styrene Butadiene Latex | Fiber (nylon 6 and polypropylene) | Dirt |
|---|---|---|---|---|
| Post-consumer Fuel | 16.38 | 3.04 | 70.57 | 10.01 |
| Post-consumer Fines | 49.03 | 9.11 | 11.89 | 29.97 |

The information in Table 2 can be expressed using the process flow rate based on 14,600 lbs/hr recycled carpet input as shown in Table 3.

TABLE 3

Weight composition of carpet recycle stream, carpet as fuel, and carpet fines (lbs/hr) based on 14,600 lbs/hr recycled carpet input (47 wt % PC and 53 wt % PI), based on a 50 wt % split to fuel and 50 wt % split to carpet fines

|  | Total mass flow | Filler (calcium carbonate and aluminum hydrate) | Styrene Butadiene Latex | Fiber (nylon 6 and polypropylene) | Dirt |
|---|---|---|---|---|---|
| Post Industrial Carpet | 7,739 | 3,165 | 588 | 3,985 | 0 |
| Post Industrial Carpet as Fuel | 3,868 | 791 | 147 | 2,930 | 0 |
| Post Industrial Carpet Fines | 3,870 | 2,374 | 441 | 1,055 | 0 |
| Post-consumer carpet | 6,862 | 2,245 | 417 | 2,827 | 1,372 |
| Post-consumer carpet as fuel | 3,428 | 561 | 104 | 2,419 | 343 |
| Post-consumer carpet fines | 3,435 | 1,684 | 313 | 408 | 1,029 |

By combining the values in Tables 2 and 3, the flow and composition of the fuel and fines streams can be obtained (Table 4). Examining just the fuel stream, the representative styrene butadiene latex-backed broadloom composition (Carpet and Rug Institute) was used to subdivide the fiber into nylon (83 wt % of fiber portion) and polypropylene (17 wt % of fiber portion). This provides the detailed composition of the fuel fiber stream (Table 5). Also, the styrene butadiene latex-backed broadloom composition allowed subdivision of the filler into calcium carbonate (60 wt %) and aluminum trihydrate (40 wt %).

TABLE 4

Total mass flow (lb/hr) and weight composition (wt %) of PI/PC carpet input, carpet as fuel, and carpet fines.

|  | Total mass flow | Filler (calcium carbonate and aluminum hydrate) | Styrene Butadiene Latex | Fiber (nylon 6 and polypropylene) | Dirt |
|---|---|---|---|---|---|
| Carpet input (PI and PC) | 14,601 100.00% | 5,411 37.06% | 1,005 6.88% | 6,813 46.66% | 1,372 9.40% |
| Carpet fuel portion | 7,296 100.00% | 1,353 18.54% | 251 3.44% | 5,349 73.31% | 343 4.70% |
| Carpet fines portion | 7,305 100.00% | 4,058 55.55% | 754 10.32% | 1,463 20.03% | 1,029 14.09% |

TABLE 5

Composition of carpet as fuel stream (wt %), at total carpet as fuel flow of 7,300 lb/hr.

|  | Nylon 6 | Poly-propylene | SB Latex | CaCO3 | Al(OH)3 | Dirt |
|---|---|---|---|---|---|---|
| Carpet as fuel | 60.73 | 12.59 | 3.44 | 11.2 | 7.3 | 4.70 |

Based on the heat of combustion and molecular information for each component (see Table 6), the heat of combustion was estimated to be 26,600 kJ/kg carpet as fuel, which is 11,400 BTU/lb carpet as fuel.

TABLE 6

Heat of combustion and molecular information for carpet as fuel stream (wt % of component)

| Components | Weight, kg/hr | Hcomb (kJ/kg) | CO2 kg/kg component | C | H | N | O | Ash |
|---|---|---|---|---|---|---|---|---|
| Nylon 6 | 4,440 | −32,000 | 2.34 | 63.7 | 9.7 | 12.3 | 14.2 | 0.0 |
| Polypropylene | 909 | −43,200 | 3.14 | 85.7 | 14.3 | 0.0 | 0.0 | 0.0 |
| SB Latex | 251 | −44,000 | 3.34 | 91.1 | 8.9 | 0.0 | 0.0 | 0.0 |
| Aluminum Hydroxide | 534 | 1,300 | 0.00 |  |  |  |  | 100.0 |
| CaCO3 | 819 | 1,800 | 0.44 | 12.0 | 0.0 | 0.0 | 48.0 | 40.0 |
| Dirt | 343 | 0 | 0.00 |  |  |  |  | 100.0 |
| Value judged representative of weighted average carpet fuel | 7,300 | −26,600 | 2.01 | 52.6 | 8.0 | 8.3 | 8.0 | 23.0 |

The estimated CO2 emission, based on the carbon portion of the composition of the carpet fuel, is 2.01 lb CO2/lb carpet as fuel. With a fuel value of 11,400 BTU/lb carpet fuel, this is 180 lb CO2/mmBTU carpet fuel combusted (0.077 kg CO2/MJ carpet fuel). The air flow is based on excess oxygen for the fuel burner (design rule 12.5*fuel input=combustion gas flow). This is in the range of 84,000-85,000 lb wet air/hr. Using the carpet fuel composition, Table 6 and the air flow, estimates of the flue gas composition were made. (Table 7).

TABLE 7

Flue gas composition from carpet as fuel in Re2E

| Emission Constituent | wt % |
|---|---|
| Carbon dioxide | 14 |
| Nitrogen | 72 |
| Oxygen | 7 |
| Water | 7 |
| SOx | Estimated from fuel composition to be negligible |
| NOx | Not currently available |

Figure 7A:
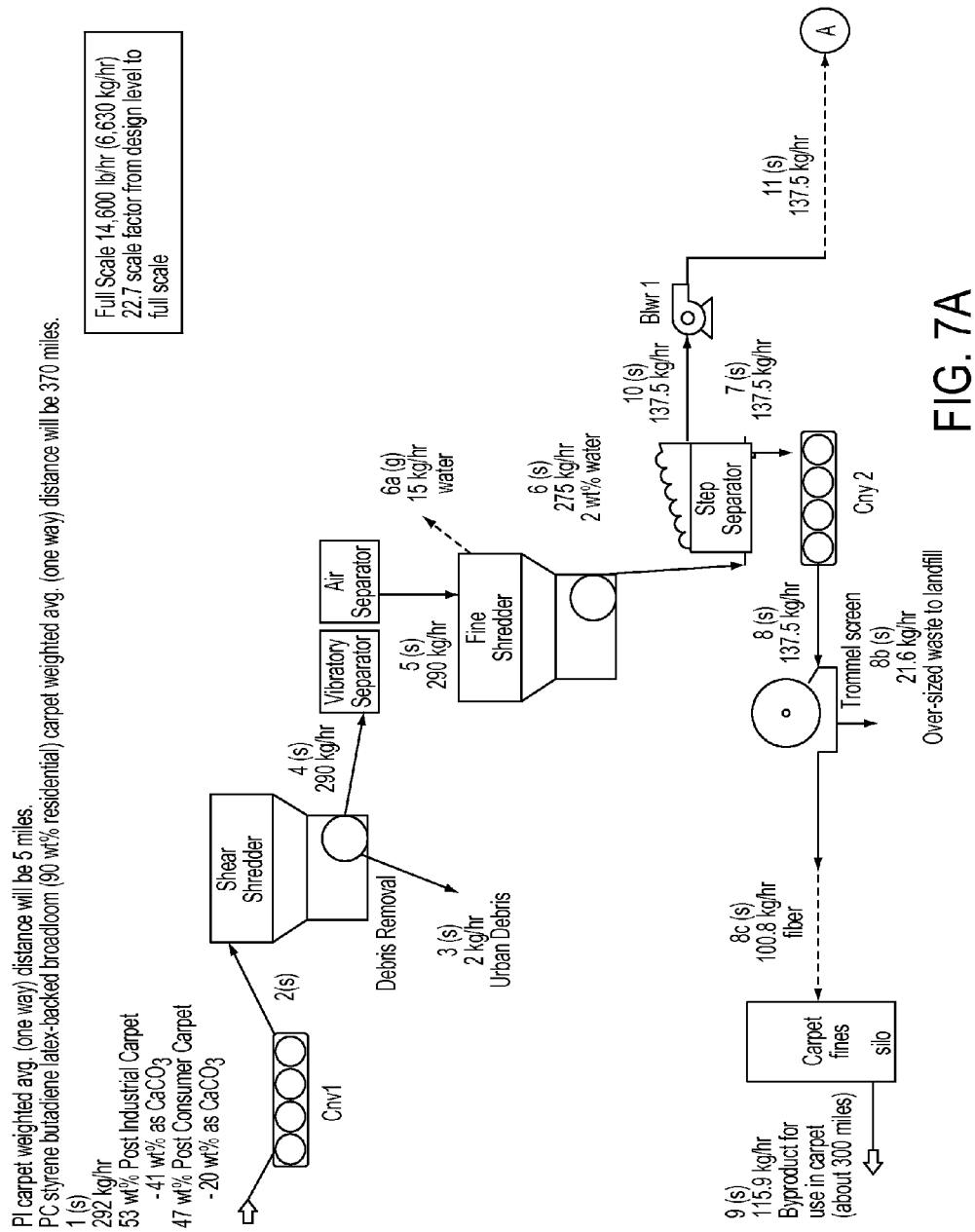
FIGS. 7A-7C are schematic depictions of various stages of an exemplary method and system as described herein.
Figure 7B:
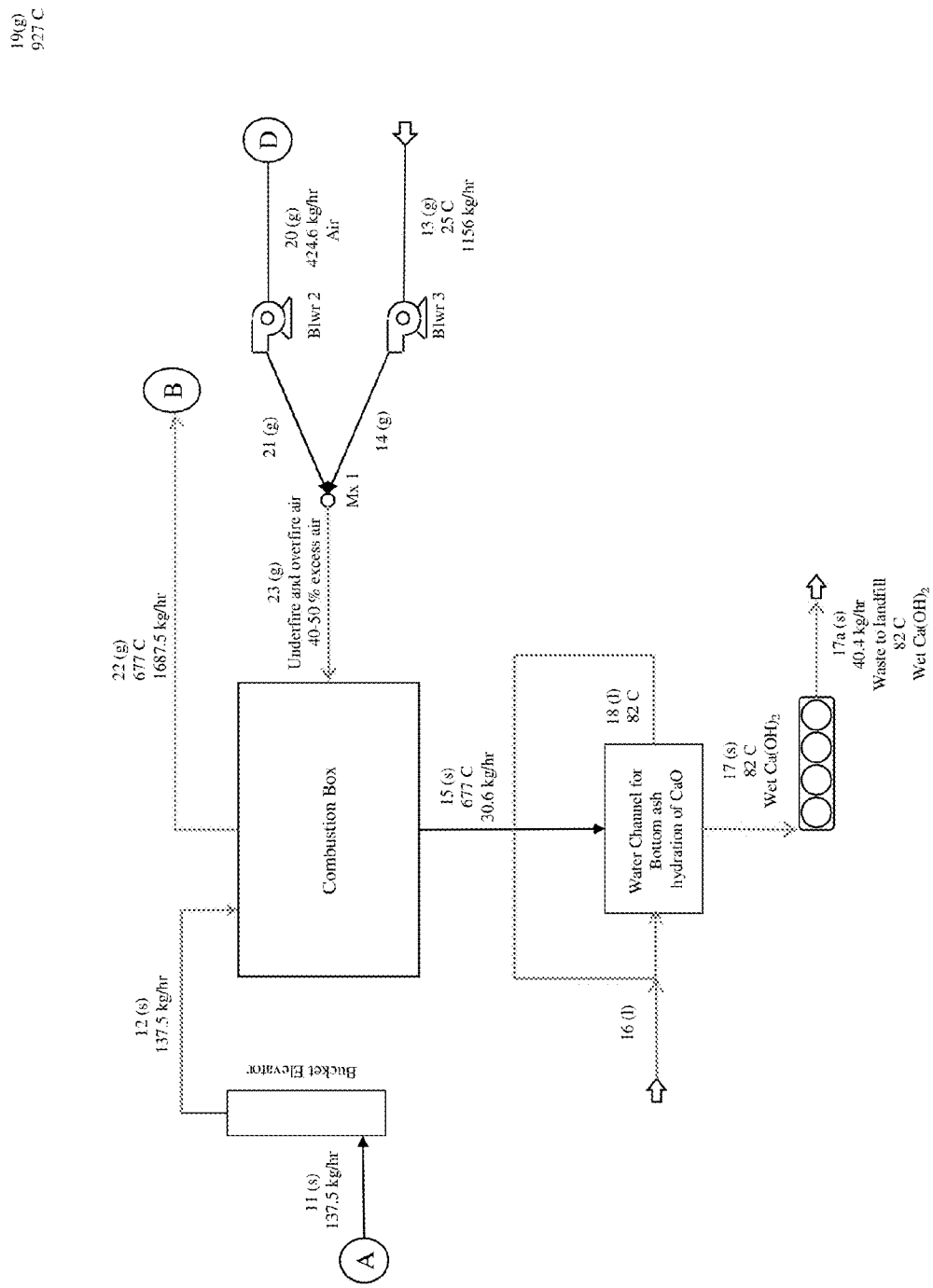
Figure 7C:
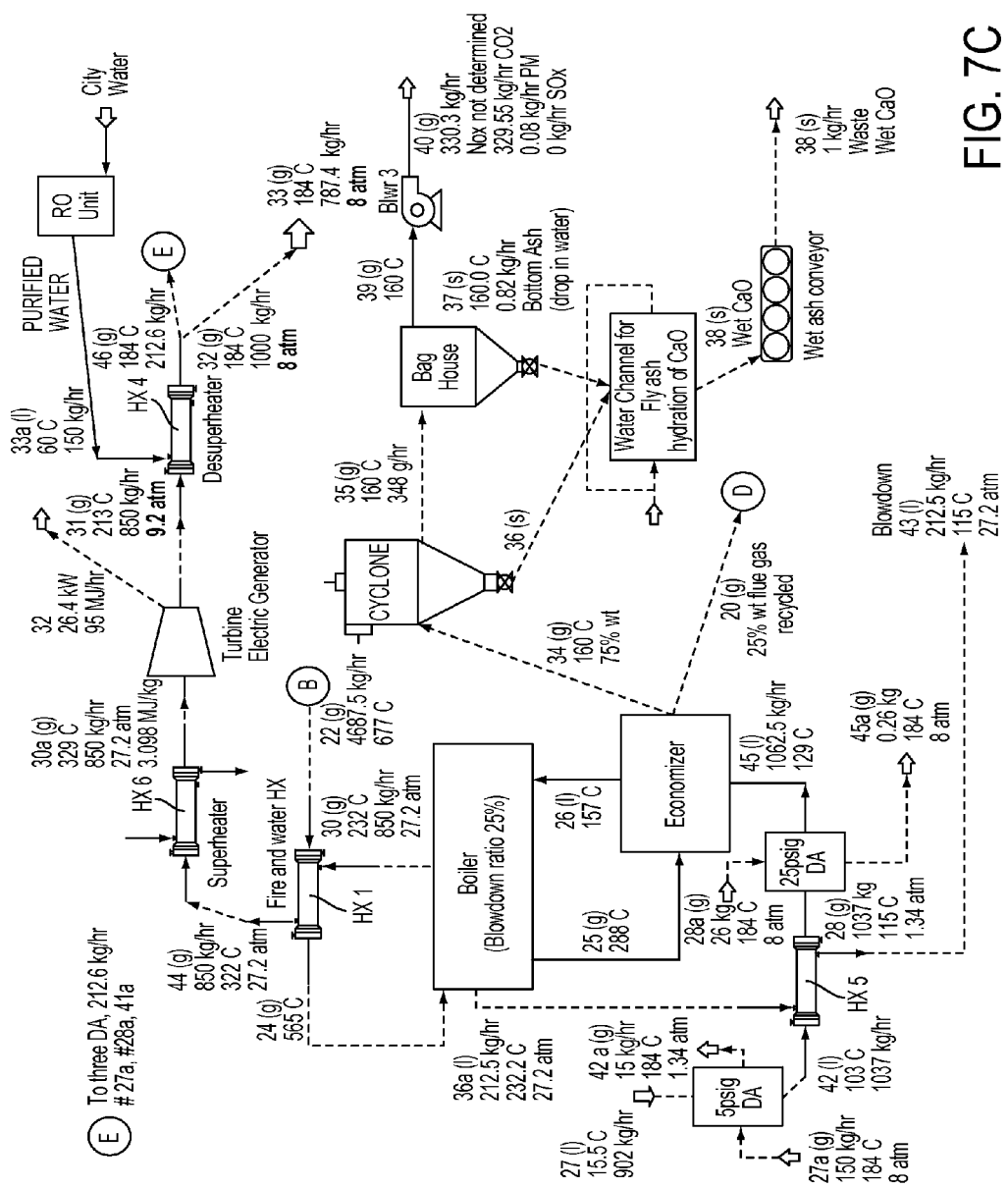

The process flow diagram and schematics of the exemplary process are given in FIGS. 7A-7C. The process flow diagram is provided on a modular basis of 1,000 kg steam output/hr, so that it is easily scaled or compared to other boiler and fuel-to-steam plant life cycle inventory analyses.

The life cycle analysis for the inputs and energy outputs of the process consist of five segments. First is the carpet fuel input (50 wt % of total carpet input). For the initial life cycle assessment a heat value of 10,900 BTU/lb as is carpet (25.3 MJ/kg) was used. The rate of carpet fuel is thus 84,100 MJ/hr for the full design and 3,700 MJ/hr for the life cycle module design case (1,000 kg steam/hr).

The second segment is the direct energy output of the process—steam at 365° F. (185° C.) and 120 psig (8.2 atm) plus 600 kW of electricity (FIG. 7C). When expressed on a MJ basis, the combined steam and electricity outputs are about 63,900 MJ/hr. The apparent steam output is 50,000 lb/hr, but about 13,500 lb steam/hr is reused in the three deaerators (FIG. 7C), thus reducing the delivered steam to the carpet process to 36,500 lb steam/hr.

A third component that must be included is the supplemental process energy consumed in relation to the overall process and management of the various material outputs. This includes electrical operation of equipment, nonprocess lighting, steam loss in deaerators, water loss in blowdown, transport of PI and PC carpet and the operation and installation life cycle of the landfill for the oversize and ash. These supplemental energy consumption items are about 3,190 MJ/hr or about 5% of the energy output as steam and electricity. These life cycle components reduce the overall carpet fuel conversion efficiency.

Life cycle analysis provides the fourth segment, which are credits for the overall carpet material that is not combusted but used as filler, as well as credit for not landfilling the PC and PI carpet. The material credit relates to carpet fines as a byproduct which generally replace calcium carbonate and hence the credit is that of the cradle-to-gate life cycle energy of calcium carbonate (about 105 BTU/lb calcium carbonate or 0.24 MJ/kg). In addition, since the whole carpet is not placed in a landfill, the landfill life cycle inventory energy is avoided. The life cycle inventory landfill energy (169 MJ/mt as is material input to landfill) is derived in a separate life cycle analysis and includes landfill construction and operation. This credit is a minimum value since any carpet degradation and conversion to methane is not included and would result in an even higher avoided credit.

The final segment of the life cycle analysis is the credit for not using various fuels to make the steam and electricity produced by the exemplary process, That is, by substituting barrels of carpet for barrels of fossil fuels, this credit accounts for those unused fossil resources. The avoided fuel for making conventional steam was taken to be natural gas, while the fuel to make electricity was calculated from the U.S. grid.

Comparing the energy outputs of steam and electricity to the carpet fuel values, the energy efficiency is about 76%. With other measurements inside the process and the state of the start-up, the efficiency is probably in the range of 70%-80%. Additionally, the plant has various auxiliary energy needs that reduce the apparent steam and electricity outputs. Including these, the process efficiency is at the low end of the range, about 70%. As byproduct credits for carpet material used as calcium carbonate filler and credit for not landfilling carpet are added, the net energy increases slightly by 2%-3% (to 72%). However, including the avoided fossil fuel, the process becomes a net energy gain and is about 160% of the fuel value of the input carpet.

Using an annual period for operation of the exemplary process as designed, the fossil fuel saved was evaluated (Table 9). Reclaiming PI and PC carpet through the described process saves about 65,000 bbl oil per year or 360 million cubic feet of natural gas per year.

TABLE 9

Fossil resources avoided by carpet-to-carpet energy recycle Design Operation, 42,000 tons carpet/year (5,760 hr/yr operation)

| Outputs | Carpet Fuel Energy Outputs, million MJ/year | natural resource energy required for process outputs, million MJ/yr | Fossil Fuel Avoided, expressed as bbl oil/year | Fossil Fuel Avoided, expressed as thousand scf natural gas/year |
|---|---|---|---|---|
| steam to carpet mill, 37,500 lb/hr | 267 | 367 | 58,202 | 318,844 |
| electricity, 600 kw | 12 | 45 | 7,169 | 39,272 |
| Total | 279 | 412 | 65,370 | 358,116 |
| natural gas, MJ/kg | natural gas, MJ/scf | crude oil, MJ/kg | crude oil, kg/barrel | |
| 53.5 | 1.15 | 45 | 140 | |

Although several embodiments of the invention have been disclosed in the foregoing specification, it is understood by those skilled in the art that many modifications and other embodiments of the invention will come to mind to which the invention pertains, having the benefit of the teaching presented in the foregoing description and associated drawings. It is therefore understood that the invention is not limited to the specific embodiments disclosed herein, and that many modifications and other embodiments of the invention are intended to be included within the scope of the invention. Moreover, although specific terms are employed herein, they are used only in a generic and descriptive sense, and not for the purposes of limiting the described invention.

Various publications are referenced in this document. These publications in their entireties are hereby incorporated by reference into this application in order to more fully describe the state of the art to which the disclosed system and method pertains. The references disclosed are also individually and specifically incorporated by reference herein for the material contained in them that is discussed in the sentence in which the reference is relied upon.

What is claimed is:

1. A method for energy production, comprising:
   providing a carpet waste composition, the carpet waste composition comprising an inorganic filler component and a first organic component;
   mechanically treating the carpet waste composition such that at least a portion of the first organic component of the carpet waste composition is separated from the carpet waste composition;
   producing a first combustible stream comprising the at least a portion of the first organic component of the carpet waste composition;
   from the carpet waste composition, producing a first waste stream comprising a reclaimed inorganic filler composition that is substantially free of the organic component of the carpet waste composition;
   delivering the first waste stream to a first waste storage unit;
   selectively delivering the first combustible stream to a boiler; and
   directly combusting the first combustible stream within the boiler.

2. The method of claim 1, further comprising the steps of:
   generating ash and at least one useable energy product upon directly-combusting the first combustible stream within the boiler, thereby producing a second waste stream comprising the ash; and
   delivering the second waste stream to a second waste storage unit.

3. The method of claim 1, wherein the carpet waste composition comprises a post consumer carpet.

4. The method of claim 1, wherein the carpet waste composition comprises a post industrial carpet.

5. The method of claim 1, wherein the inorganic filler component of the carpet waste composition comprises carpet fines.

6. The method of claim 1, wherein the inorganic filler component of the carpet waste composition comprises calcium carbonate.

7. The method of claim 1, wherein the organic component of the carpet waste composition comprises carpet fibers.

8. The method of claim 2, wherein the at least one useable energy product comprises steam.

9. The method of claim 2, wherein the at least one useable energy product comprises electricity.

10. The method of claim 2, wherein the first waste stream is distinct and isolated from the second waste stream.

11. The method of claim 1, wherein the carpet waste composition is provided in the form of bales.

12. The method of claim 1, wherein the first combustible stream has a BTU/weight content ranging from about 8,000 BTU/lb to about 12,000 BTU/lb.

13. The method of claim 12, wherein the carpet waste composition has an overall BTU/weight content, and wherein the BTU/weight content of the first combustible stream is greater than the overall BTU/weight content of the carpet waste composition.

14. The method of claim 1, wherein the first combustible stream has a BTU/weight content of at least 10,400 BTU/lb.

15. The method of claim 2, further comprising adding a second organic component to the first combustible stream before delivery of the first combustible stream to the boiler.

16. The method of claim 15, wherein the first and second organic components each have a BTU/weight content, and wherein the second organic component has a higher BTU/weight content than the first organic component.

17. The method of claim 2, further comprising conditioning the second waste stream through maceration and dewatering.

18. The method of claim 1, wherein the step of mechanically treating the carpet waste composition comprises shredding the carpet waste composition into reduced portions.

19. The method of claim 18, wherein the step of mechanically treating the carpet waste composition further comprises vibrating the shredded carpet waste composition such that at least a portion of any post-consumer dirt within the carpet waste composition is separated from the remainder of the carpet waste composition and directed to the first waste stream.

20. The method of claim 1, wherein at least a portion of the first waste stream comprises recyclable material.

21. The method of claim 1, wherein the first waste stream comprises recyclable material.

22. The method of claim 1, wherein the step of selectively delivering the first combustible stream to the boiler comprises selectively delivering the first combustible stream to a grate section of the boiler, the grate section having a plurality of stepped grates that are configured to burn the first combustible stream, wherein at least every other grate of the plurality of stepped grates is configured to articulate in a reciprocating motion to affect the sequential downward tumbling of the first combustible stream as it is burned and consumed.

23. A method for energy production, comprising:
   providing a carpet waste composition, the carpet waste composition comprising an inorganic filler component and a first organic component;
   mechanically treating the carpet waste composition such that at least a portion of the first organic component of the carpet waste composition is separated from the carpet waste composition;
   producing a first combustible stream comprising the at least a portion of the first organic component of the carpet waste composition;
   from the carpet waste composition, producing a first waste stream comprising a reclaimed inorganic filler composition that is substantially free of the organic component of the carpet waste composition;
   delivering the first waste stream to a first waste storage unit, wherein at least a portion of the first waste stream comprises recyclable material;
   selectively delivering the first combustible stream to a boiler; and
   directly combusting the first combustible stream within the boiler.

24. A method for energy production, comprising:
   providing a carpet waste composition, the carpet waste composition comprising an inorganic filler component and a first organic component;
   mechanically treating the carpet waste composition such that at least a portion of the first organic component of the carpet waste composition is separated from the carpet waste composition;
   producing a first combustible stream comprising the at least a portion of the first organic component of the carpet waste composition;
   from the carpet waste composition, producing a first waste stream comprising a reclaimed inorganic filler composition that is substantially free of the organic component of the carpet waste composition;

delivering the first waste stream to a first waste storage unit, wherein at least a portion of the first waste stream comprises recyclable material;
selectively delivering the first combustible stream to a boiler; and
directly combusting the first combustible stream within the boiler,
wherein the step of selectively delivering the first combustible stream to the boiler comprises selectively delivering the first combustible stream to a grate section of the boiler, the grate section having a plurality of stepped grates that are configured to burn the first combustible stream, wherein at least every other grate of the plurality of stepped grates is configured to articulate in a reciprocating motion to affect the sequential downward tumbling of the first combustible stream as it is burned and consumed.

25. The method of claim 23, wherein the first combustible stream has a BTU/weight content ranging from about 8,000 BTU/lb to about 12,000 BTU/lb, and wherein the carpet waste composition has an overall BTU/weight content, and wherein the BTU/weight content of the first combustible stream is greater than the overall BTU/weight content of the carpet waste composition.

26. The method of claim 1, further comprising the steps of:
generating ash and at least one useable energy product upon directly-combusting the first combustible stream within the boiler, thereby producing a second waste stream comprising the ash; and
delivering the second waste stream to a second waste storage unit.

27. The method of claim 26, further comprising conditioning the second waste stream through maceration and dewatering.

28. The method of claim 23, wherein the step of selectively delivering the first combustible stream to the boiler comprises selectively delivering the first combustible stream to a grate section of the boiler, the grate section having a plurality of stepped grates that are configured to burn the first combustible stream, wherein at least every other grate of the plurality of stepped grates is configured to articulate in a reciprocating motion to affect the sequential downward tumbling of the first combustible stream as it is burned and consumed.

29. The method of claim 23, wherein the step of mechanically treating the carpet waste composition comprises shredding the carpet waste composition into reduced portions.

30. The method of claim 29, wherein the step of mechanically treating the carpet waste composition further comprises vibrating the shredded carpet waste composition such that at least a portion of any post-consumer dirt within the carpet waste composition is separated from the remainder of the carpet waste composition and directed to the first waste stream.

31. The method of claim 24, wherein all of the first waste stream comprises recyclable material.

* * * * *